(12) United States Patent  
Cooke et al.

(10) Patent No.: US 8,106,942 B2
(45) Date of Patent: Jan. 31, 2012

(54) IMAGE ACQUIRING APPARATUS, IMAGE ACQUIRING METHOD, AND IMAGE ACQUIRING PROGRAM

(75) Inventors: Jeremy Cooke, Welwyn Garden (GB); Takayuki Inoue, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1601 days.

(21) Appl. No.: 11/477,800

(22) Filed: Jun. 30, 2006

(65) Prior Publication Data

US 2007/0206105 A1 Sep. 6, 2007

(30) Foreign Application Priority Data

Mar. 1, 2006 (JP) ................................ P2006-055515

(51) Int. Cl.
*H04N 7/18* (2006.01)
*G06F 15/00* (2006.01)

(52) U.S. Cl. .......................................... 348/79; 382/128

(58) Field of Classification Search .................. 348/294, 348/79, 80; 382/133, 100, 139, 129, 130, 382/131, 132, 134, 181, 224, 226, 321, 325, 382/270, 145, 147, 227, 128, 240, 284, 294, 382/138, 282, 305, 306

See application file for complete search history.

(56) References Cited

U.S. PATENT DOCUMENTS

| 5,218,645 | A * | 6/1993 | Bacus | 382/133 |
|---|---|---|---|---|
| 5,933,519 | A | 8/1999 | Lee et al. | |
| 6,226,392 | B1 | 5/2001 | Bacus et al. | |
| 6,272,235 | B1 | 8/2001 | Bacus et al. | 382/133 |
| 6,396,941 | B1 | 5/2002 | Bacus et al. | 382/128 |
| 6,522,774 | B1 | 2/2003 | Bacus et al. | 382/133 |
| 6,674,881 | B2 | 1/2004 | Bacus et al. | 382/128 |
| 6,674,884 | B2 | 1/2004 | Bacus et al. | 382/133 |
| 6,711,283 | B1 | 3/2004 | Soenksen | 382/133 |
| 6,816,606 | B2 | 11/2004 | Wetzel et al. | 382/128 |
| 6,847,729 | B1 | 1/2005 | Clinch et al. | 382/128 |
| 6,917,696 | B2 | 7/2005 | Soenksen | 382/128 |
| 7,062,311 | B1 * | 6/2006 | Sendai et al. | 600/407 |
| 7,653,260 | B2 * | 1/2010 | Perz et al. | 382/284 |
| 2002/0102011 | A1 * | 8/2002 | Bacus et al. | 382/128 |

(Continued)

FOREIGN PATENT DOCUMENTS

JP  H1-248878  10/1989

(Continued)

*Primary Examiner* — Behrooz Senfi
(74) *Attorney, Agent, or Firm* — Drinker Biddle & Reath LLP

(57) ABSTRACT

An image acquiring apparatus is made up of a macro image acquiring unit 20 used to acquire a macro image of each of a plurality of samples S, and a control unit 60 including a macro image acquisition control unit used to control a macro image acquiring operation and an image pickup condition setting unit used to set an image pickup condition for a micro image of the sample S with reference to the macro image. The control unit 60 includes a session managing unit used to define a session in accordance with a sample group consisting of the samples S and to manage a data group including data of the macro image and the image pickup condition as session data associated with the sample group for each session. According to this structure, it is possible to realize an image acquiring apparatus, an image acquiring method, and an image acquiring program capable of suitably managing image acquisition processing performed to acquire an image of each of a plurality of samples.

12 Claims, 15 Drawing Sheets

U.S. PATENT DOCUMENTS

| | | |
|---|---|---|
| 2003/0112330 A1* | 6/2003 | Yuri et al. ............. 348/80 |
| 2003/0231791 A1* | 12/2003 | Torre-Bueno et al. ........ 382/133 |
| 2004/0184678 A1 | 9/2004 | Maddison ............. 382/291 |
| 2005/0190437 A1 | 9/2005 | Nakagawa |
| 2005/0270611 A1* | 12/2005 | Oshiro et al. ............. 359/205 |

FOREIGN PATENT DOCUMENTS

| | | |
|---|---|---|
| JP | H8-068946 | 3/1996 |
| JP | H8-299851 | 11/1996 |
| JP | H11-299706 | 11/1999 |
| JP | 2003-248176 | 9/2003 |
| WO | WO 98/39728 | 9/1998 |
| WO | WO 01/84209 | 11/2001 |
| WO | WO 02/50759 | 6/2002 |
| WO | WO 2005/036451 | 4/2005 |
| WO | WO 2006/023675 | 3/2006 |

* cited by examiner

Fig.3
(a)
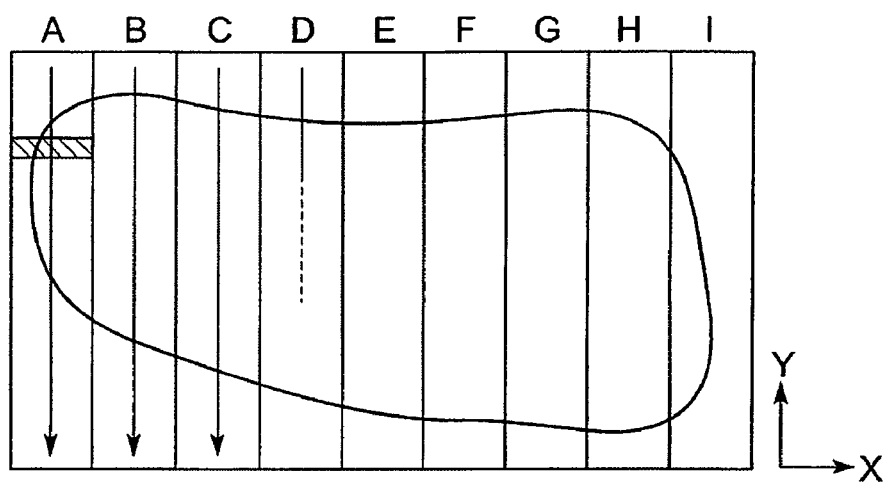
(b)
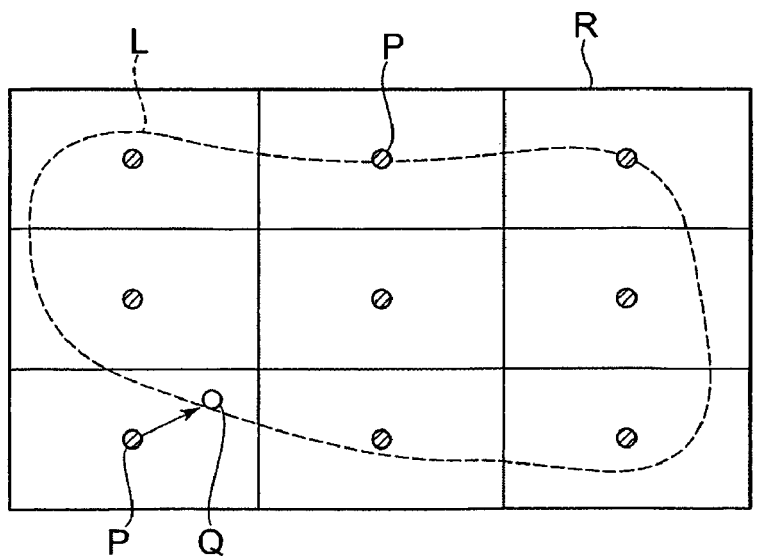

IMAGE ACQUIRING APPARATUS, IMAGE ACQUIRING METHOD, AND IMAGE ACQUIRING PROGRAM

BACKGROUND OF THE INVENTION

1. Field of the Invention

The present invention relates to an image acquiring apparatus, an image acquiring method, and an image acquiring program for acquiring images of a sample.

2. Related Background Art

Recently, in the field of pathology, etc., there are known virtual microscopes which can be operated as if an operator operates a sample through a real microscope in a virtual space of a personal computer or the like. Sample data to be handled in such a virtual microscope is based on image data of a sample acquired in advance by using a real microscope at high resolution.

For realizing image operation in the virtual microscope, it is demanded that an image acquiring apparatus which acquires image data of a sample to be thus used in a virtual microscope acquires an image of a sample at sufficiently high resolution. For example, Document 1: U.S. Pat. No. 6,816,606 discloses a system for acquiring an image of a sample by use of a camera for acquiring macroscopic images and a camera for acquiring high-resolution microscopic images in order to efficiently acquire a high-resolution image.

SUMMARY OF THE INVENTION

In the acquisition of image data of a sample used in a virtual microscope, there is a case in which many slides in each of which a biological sample or the like is sealed with slide glass are prepared as samples, and image acquisition is successively performed with respect to these slides. In the image acquisition of such a plurality of slides, there is a need to appropriately manage the image acquisition processing.

For example, if an image of a sample is intended to be acquired as a high-resolution image, much time will be consumed to complete image acquisition with respect to all of the samples. Therefore, once samples are set in an image acquiring apparatus, the image acquiring apparatus comes to be occupied in performing an image acquisition processing to acquire the images of the samples for a long stretch of time, and hence, great limitations are imposed on the degree of freedom of work performed by an operator.

The present invention has been made to solve the problem, and it is therefore an object of the present invention to provide an image acquiring apparatus, an image acquiring method, and an image acquiring program capable of suitably managing image acquisition processing performed to acquire an image of each of a plurality of samples.

In order to achieve the above object, an image acquiring apparatus according to the present invention includes (1) macro image acquiring means for acquiring a macro image of each of a plurality of samples and (2) control means including macro image acquisition control means for controlling an operation to acquire the macro image by the macro image acquiring means, and image pickup condition setting means for setting an image pickup condition for a micro image of the sample with reference to the macro image, wherein (3) the control means includes session managing means for defining a session in accordance with a sample group consisting of the plurality of samples and managing a data group including data of the macro image and the image pickup condition for each of the plurality of samples as session data associated with the sample group for each session.

An image acquiring method according to the present invention includes (1) a macro image acquiring step of acquiring a macro image of each of a plurality of samples and (2) a control step including a macro image acquisition control step of controlling an operation to acquire the macro image by the macro image acquiring step, and an image pickup condition setting step of setting an image pickup condition for a micro image of the sample with reference to the macro image, wherein (3) the control step includes a session managing step of defining a session in accordance with a sample group consisting of the plurality of samples and managing a data group including data of the macro image and the image pickup condition for each of the plurality of samples as session data associated with the sample group for each session.

Furthermore, an image acquiring program according to the present invention is (1) applied to an image acquiring apparatus including macro image acquiring means for acquiring a macro image of each of a plurality of samples and includes (2) a control processing including a macro image acquisition control processing for controlling an operation to acquire the macro image by the macro image acquiring means, and an image pickup condition setting processing for setting an image pickup condition for a micro image of the sample with reference to the macro image, wherein (3) the control processing includes a session managing processing for defining a session in accordance with a sample group consisting of the plurality of samples and managing a data group including data of the macro image and the image pickup condition for each of the plurality of samples as session data associated with the sample group for each session, and the control processing is executed by a computer.

In the image acquiring apparatus, the image acquiring method, and the image acquiring program mentioned above, to control an image acquisition processing performed for a sample group consisting of a plurality of samples, the concept of a session is employed in association with the sample group. A sample group for which image acquisition is performed and session data that is a data group including image data of an acquired macro image are correlated with each other for each session, and image acquisition processing is managed under this relationship. According to this structure, image acquisition processing can be suitably managed to acquire an image of each of a plurality of samples. Additionally, the degree of freedom of work conducted by an operator can be greatly heightened by performing this session management. Concerning a plurality of samples, it is preferable to provide a sample storage means for storing a plurality of samples, for example. Alternatively, such a plurality of samples may be managed by, for example, bar-code information attached to the sample.

According to the image acquiring apparatus, the image acquiring method, and the image acquiring program of the present invention, the concept of a session is employed in the control of an image acquisition processing for a sample group consisting of a plurality of samples, and the sample group for image acquisition and session data that is a data group including acquired image data are associated with each other for each session, as a result, image acquisition processing thereof can be suitably managed.

BRIEF DESCRIPTION OF THE DRAWINGS

FIG. 3 is a figure with schematic views showing a method for acquiring an image of a sample.

DESCRIPTION OF THE PREFERRED EMBODIMENTS

Figure 1:
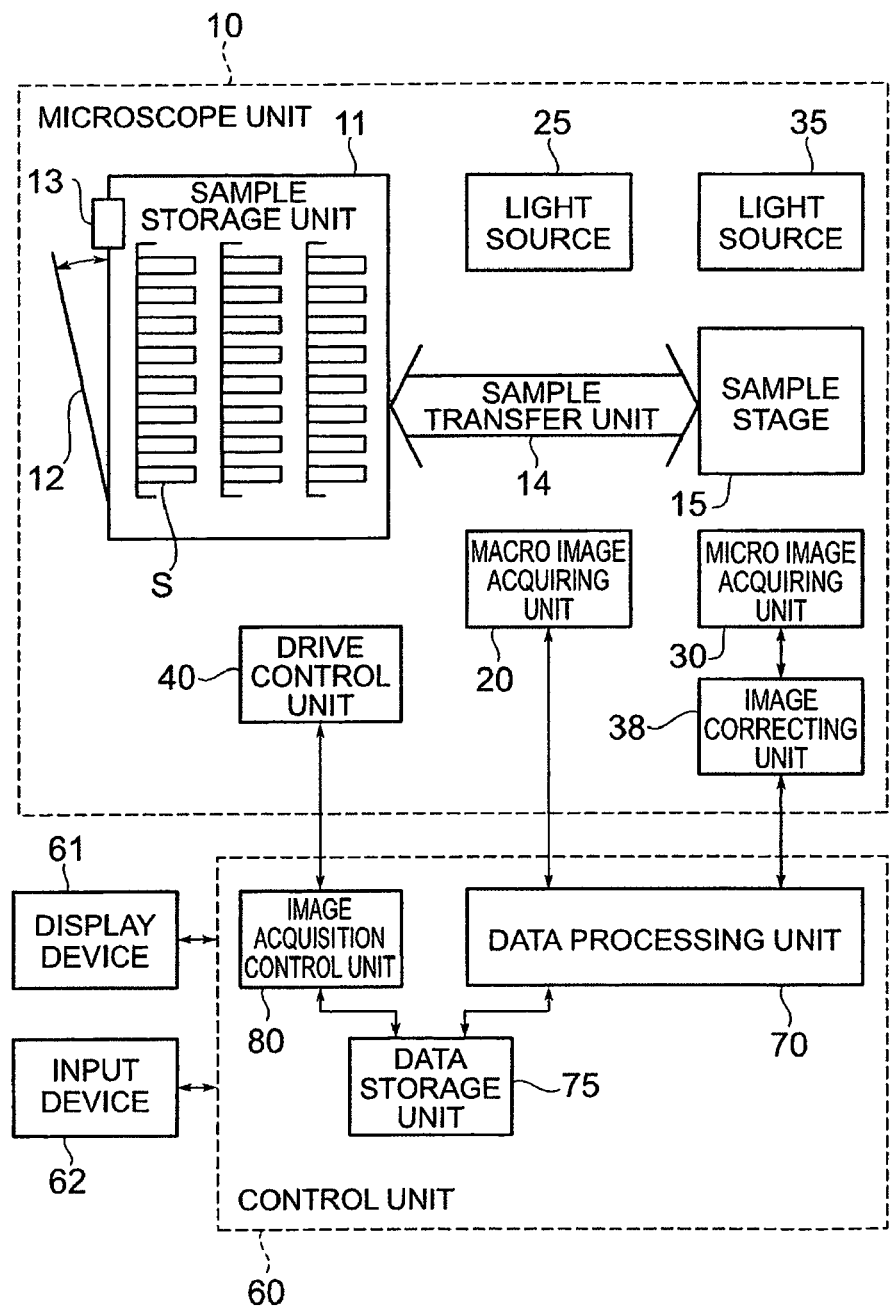
FIG. 1 is a block diagram showing a structure of an embodiment of an image acquiring apparatus.

Hereinafter, preferred embodiments of an image acquiring apparatus, an image acquiring method, and an image acquiring program of the invention will be described along with the drawings. In the description of the drawings, the same components are attached with the same reference numerals, and overlapping description will be omitted. The dimensional ratios of the drawings are not always the same as those in the description.

First, an entire structure of an image acquiring apparatus will be described. FIG. 1 is a block diagram showing a structure of an embodiment of an image acquiring apparatus according to the invention. The image acquiring apparatus according to this embodiment is a microscope system used to acquire images of a sample S with high resolution, and is made up of a microscope unit 10 used to acquire images of the sample S and a control unit 60 that controls the microscope unit 10 acquiring the images. A slide (preparation) in which a biological sample, such as a tissue slice, is enclosed in a slide glass when image data to be used in a virtual microscope is acquired can be mentioned as an example of the sample S serving as an object of image acquisition.

The microscope unit 10 includes a sample storage unit 11, a macro image acquiring unit 20, and a micro image acquiring unit 30. The sample storage unit 11 is a storage means capable of storing a sample group consisting of a plurality of samples S each of which is an object for image acquisition (e.g., a plurality of slides in each of which a biological sample is sealed). The sample storage unit 11 has a door 12 through which an operator stores the samples S and takes out the samples S. In this embodiment, the sample storage unit 11 further has an interlock mechanism 13 that prevents the door 12 from being opened by mistake during image acquisition processing.

The macro image acquiring unit 20 is first image acquiring means for acquiring a macro image as a low-magnification image of a sample S. This image acquiring unit 20 acquires a macro image at low resolution corresponding to a whole image of a sample S. A macro light source 25 is provided to supply light, which is used to produce an optical image of the sample S when macro images are acquired, for the macro image acquiring unit 20. The macro image acquiring unit 20 and the macro light source 25 are provided as necessary.

On the other hand, the micro image acquiring unit 30 is second image acquiring means for acquiring a micro image as a high-magnification image of a sample S. In this image acquiring unit 30, a micro image with high resolution of a target sample S is acquired. A micro light source 35 is provided to supply light, which is used to produce an optical image of the sample S when micro images are acquired, for the micro image acquiring unit 30. Additionally, as shown in FIG. 1, an image correcting unit 38 is disposed to make necessary corrections to image data concerning micro images acquired by the image acquiring unit 30. A dark correction, a shading correction, etc., can be mentioned as corrections performed by the image correcting unit 38. For example, a shading correction can be performed in such a way that a blank image obtained by imaging a reference sample, such as a slide on which no biological sample is placed, is pre-acquired, and then a shading correction is performed while referring to this blank image. Macro images may be corrected in the same way.

As sample moving means for moving a sample S among positions in the microscope unit 10, a sample transfer unit 14 and a sample stage 15 are provided. The sample transfer unit 14 is transferring means for transferring a sample S between a storage position in the sample storage unit 11 and each of the image acquiring positions for the macro image acquiring unit 20 and the micro image acquiring unit 30. The sample stage 15 carries a sample S placed thereon when acquiring a macro image or a micro image, and is used for setting and adjusting an image acquiring position of the sample S. The microscope unit 10 includes a drive control unit 40 that controllably drives each unit provided in the microscope unit 10.

The control unit 60 includes a data processing unit 70, a data storage unit 75, and an image acquisition control unit 80. Image data of macro images acquired by the macro image acquiring unit 20 and image data of micro images acquired by the micro image acquiring unit 30 are input into the data processing unit 70, and these image data undergo necessary data processing.

The image acquisition control unit 80 controls an operation to acquire an image of the sample S in the microscope unit 10 via the drive control unit 40. Image data input into the data processing unit 70, various data and information obtained by image data processing, or pieces of control information used in the image acquisition control unit 80 are stored and kept in the data storage unit 75 according to need.

In the image acquiring apparatus according to this embodiment, the control unit 60 performs an image acquiring operation in the microscope unit 10 and the management of image data that has been acquired while using a session defined according to the sample group of the samples S set in the sample storage unit 11. The management of the image acquisition processing using this session will be described in detail later.

The control unit 60 is formed of a computer that includes, for example, a CPU and necessary storage devices, such as memories and hard disks. A display device 61 and an input device 62 are connected to the control unit 60. The display device 61 is, for example, a CRT display or a liquid crystal display, and is used to display an operation screen necessary to operate the image acquiring apparatus or to display an acquired image of the sample S. The input device 62 is, for example, a keyboard or a mouse, and is used to input information necessary for image acquisition, to input instructions for an image acquiring operation, or to input instructions for managing or switching a session as described above.

Figure 2:
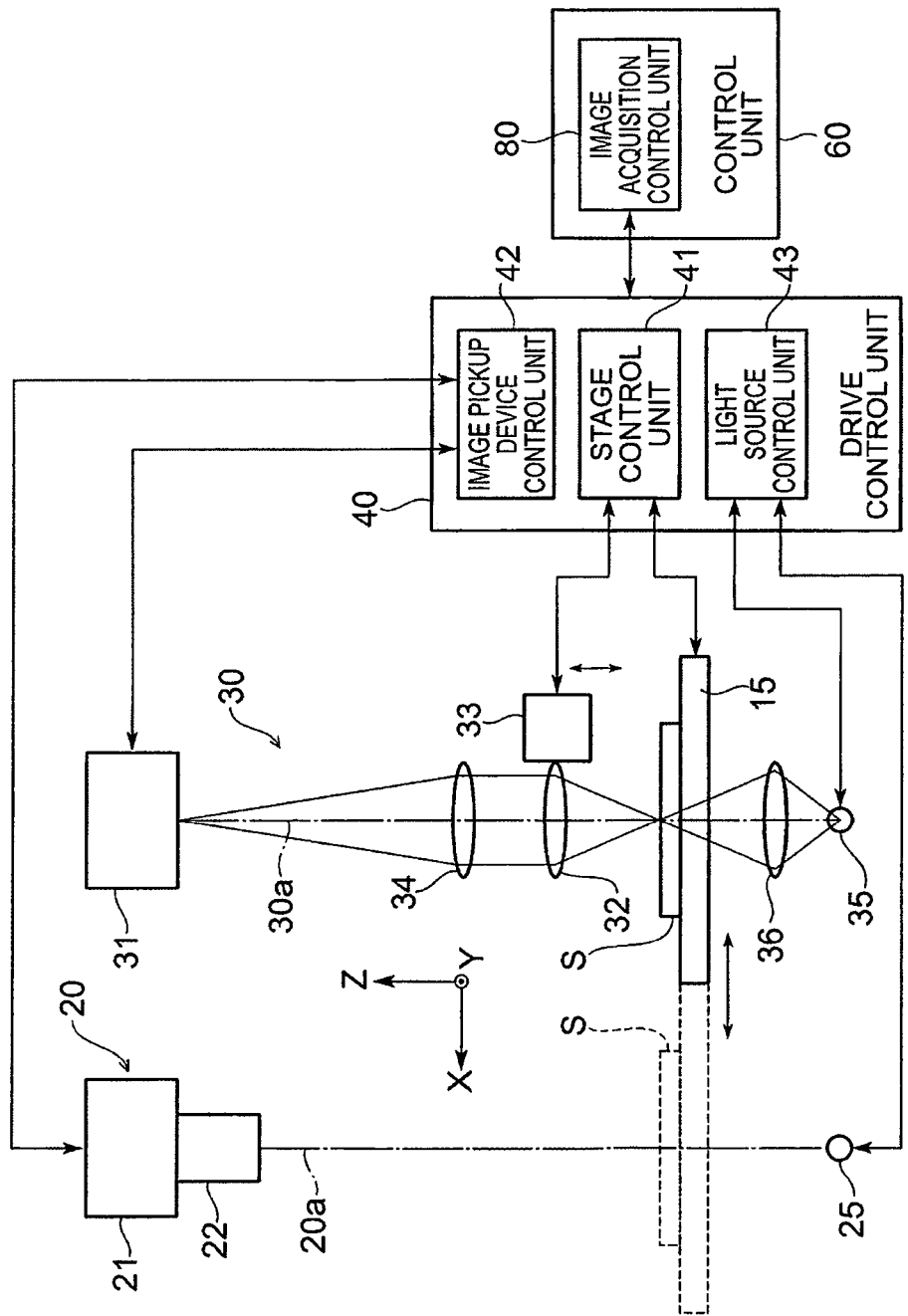
FIG. 2 is a schematic view showing a structure of a microscope unit of the image acquiring apparatus.

Next, a description will be given of a structure of the microscope unit 10 of the image acquiring apparatus shown in FIG. 1. FIG. 2 is a schematic view of the structure of the microscope unit 10. As shown in FIG. 2, the microscope unit 10 according to this embodiment is configured as a transmission type microscope system used to acquire an optical image of a sample S. Herein, two directions perpendicular to each other in a horizontal direction are defined as an X-axis direction and a Y-axis direction, respectively, and a vertical direction perpendicular to the horizontal direction is defined as a Z-axis direction, as shown in the figure. Among these directions, the Z-axis direction, i.e., the vertical direction is a direction of an optical axis for image acquisition in this microscope system. In FIG. 2, the structures of the macro image acquiring unit 20 and the micro image acquiring unit 30 are mainly shown, and the sample storage unit 11, the sample transfer unit 14, etc., are not shown.

The sample S is placed on the sample stage 15 at the time of image acquisition in the image acquiring unit 20 or 30. This sample stage 15 is structured as an XY stage movable in the X-axis direction and the Y-axis direction by using a stepping motor, a DC motor, or a servo motor. With this structure, by driving the sample stage 15 within the XY plane, the image acquiring position for the image acquiring unit 20 or 30 with respect to the sample S is set and adjusted. In this embodiment, this sample stage 15 is movable between an image acquiring position in the macro image acquiring unit 20 and an image acquiring position in the micro image acquiring unit 30.

The macro image acquiring unit 20 and the macro light source 25 are provided at respective predetermined positions on an optical axis 20a with respect to the macro image acquiring position to acquire a macro image of the sample S. The macro light source 25 is a light source from which light used to produce an optical image for macro image acquisition is projected onto the sample S, and is disposed under the sample stage 15.

The macro image acquiring unit 20 is configured by using an image pickup device 21, such as a two-dimensional CCD sensor, that is capable of acquiring a two-dimensional image by the optical image of the sample S. An image pickup optical system 22 serving as an optical system that guides the optical image of the sample S is disposed between the macro image acquiring position at which the sample S is placed and the image pickup device 21.

On the other hand, the micro image acquiring unit 30 and the micro light source 35 are provided at respective predetermined positions on an optical axis 30a with respect to the micro image acquiring position to acquire a micro image of the sample S. The micro light source 35 is a light source from which light used to produce an optical image for micro image acquisition is projected onto the sample S, and is, together with a condensing lens 36, disposed under the sample stage 15.

The micro image acquiring unit 30 is configured by using an image pickup device 31, such as a one-dimensional CCD sensor, that is capable of acquiring a one-dimensional image by the optical image of the sample S. An objective lens 32 and a light guide optical system 34, serving as an optical system that guides the optical image of the sample S, are disposed between the micro image acquiring position at which the sample S is placed and the image pickup device 31. The objective lens 32 produces an optical image of the sample S by entering light that has been transmitted through the sample S thereinto. The light guide optical system 34 is formed of, for example, a tube lens, and guides the optical image of the sample S to the image pickup device 31.

With respect to the objective lens 32, a Z stage 33 using a stepping motor or a piezo-actuator is provided, and by driving the objective lens 32 in the Z-axis direction by this Z stage 33, focusing on the sample S can be performed. As the image pickup device 31 in this micro image acquiring unit 30, an image pickup device capable of acquiring a two-dimensional image and TDI driving can also be used as well as the image pickup device capable of acquiring a one-dimensional image.

As this micro image acquiring image pickup device 31, for example, an image pickup device such as a 3-CCD camera capable of acquiring a color image is preferably used. As the macro image acquiring image pickup device 21, either a monochrome image acquiring image pickup device or an image pickup device capable of acquiring a color image can be used as appropriate. As the image pickup device 31, when acquisition of a color image is not necessary, a monochrome image acquiring image pickup device can also be used.

The drive control unit 40 includes a stage control unit 41, an image pickup device control unit 42, and a light source control unit 43 which are provided for the sample stage 15, the macro image acquiring unit 20, the micro image acquiring unit 30, the light sources 25 and 35. The stage control unit 41 controllably drives the sample stage 15, which is an XY stage, and a Z stage 33 so as to set and adjust image pickup conditions for the sample S. The image pickup device control unit 42 controllably drives the image pickup devices 21 and 31 so as to control the image acquisition of the sample S. The light source control unit 43 controllably drives the light sources 25 and 35 so as to control the projection of light used for the image acquisition of the sample S. Concerning the control of each unit of the microscope unit 10, another structure may be formed so that each unit is controlled directly by the image acquisition control unit 80 of the control unit 60 without using the drive control unit 40.

Herein, acquisition of the macro image and the micro image of the sample S in the image acquiring units 20 and 30 will be described. In the macro image acquiring unit 20, a macro image as a whole image of the sample S to be used for setting an image pickup condition of a micro image is acquired. For example, if a slide in which a biological sample or the like is enclosed in a slide glass as mentioned above is used as the sample S, an image of the whole of the slide or an image of a predetermined range including the biological sample is acquired as the macro image.

In the micro image acquiring unit 30, a micro image of the sample S at target resolution is acquired with reference to the set image pickup condition. This micro image acquisition is performed by two-dimensionally scanning the sample S at a predetermined resolution higher than that of the macro image as schematically shown in FIG. 3(a). Herein, in the micro image acquisition using the image pickup device 31 such as a one-dimensional CCD camera, in an XY plane parallel to the sample S, the longitudinal direction of an image pickup plane of the image pickup device 31 is defined as an X-axis direction, and a direction orthogonal to this longitudinal direction is defined as a Y-axis direction. In this case, in the micro image acquisition, the direction orthogonal to the longitudinal direction of the image pickup plane in the image pickup device 31, that is, the negative direction of the Y axis in FIG. 3(a) is the direction to scan the sample S.

In the micro image acquisition using the image pickup device 31 such as a one-dimensional CCD camera, first, the sample S on the sample stage 15 is scanned in the scanning direction (negative direction of the Y axis) by the image pickup device 31 to acquire a strip-like partial image A with the desired resolution. Furthermore, as shown in FIG. 3(*a*), a plurality of partial images A, B, . . . , I are acquired by repeating a plurality of times this partial image acquisition while changing the image pickup position along the longitudinal direction (positive direction of the X axis) of the image pickup plane.

By arranging partial images A through I thus obtained in the X-axis direction and combining these, the whole micro image of the sample S can be generated. By such a micro image acquiring method, it is possible to preferably acquire image data of the sample S at sufficiently high resolution. In FIG. 3(*a*), the hatched region in the partial image A, whose longitudinal direction is along the X-axis direction, shows an image pickup region corresponding to the image pickup plane in the image pickup device 31.

To set image pickup conditions of a micro image, it is preferable that an image acquiring range and focus measuring position are set as image pickup conditions of a micro image with reference to the macro image acquired by the image pickup device 21 of the macro image acquiring unit 20. As a result, from information obtained by a macro image that is the whole image of the sample S, it becomes possible to suitably set parameters used for micro image acquisition and to acquire sample image data being in an excellent state and having high resolution.

In detail, when a slide is set as a sample S as described above, as shown in FIG. 3(*b*), the image acquiring range with respect to the sample S can be set to a rectangular range R including a biological sample L in the slide as an object of image acquisition. Two-dimensional scanning of the sample S by the micro image acquiring unit 30 (see FIG. 3(*a*)) is performed within the image acquiring range R thus set. When the image acquiring range R is automatically set, it is possible to employ a method in which a range in which an object (for example, a biological sample L) whose image is acquired exists is determined, for example, by binarizing an image with reference to a threshold that has been set with respect to the brightness pattern in a macro image, and, based on a determination result, the image acquiring range R is set.

Figure 4:
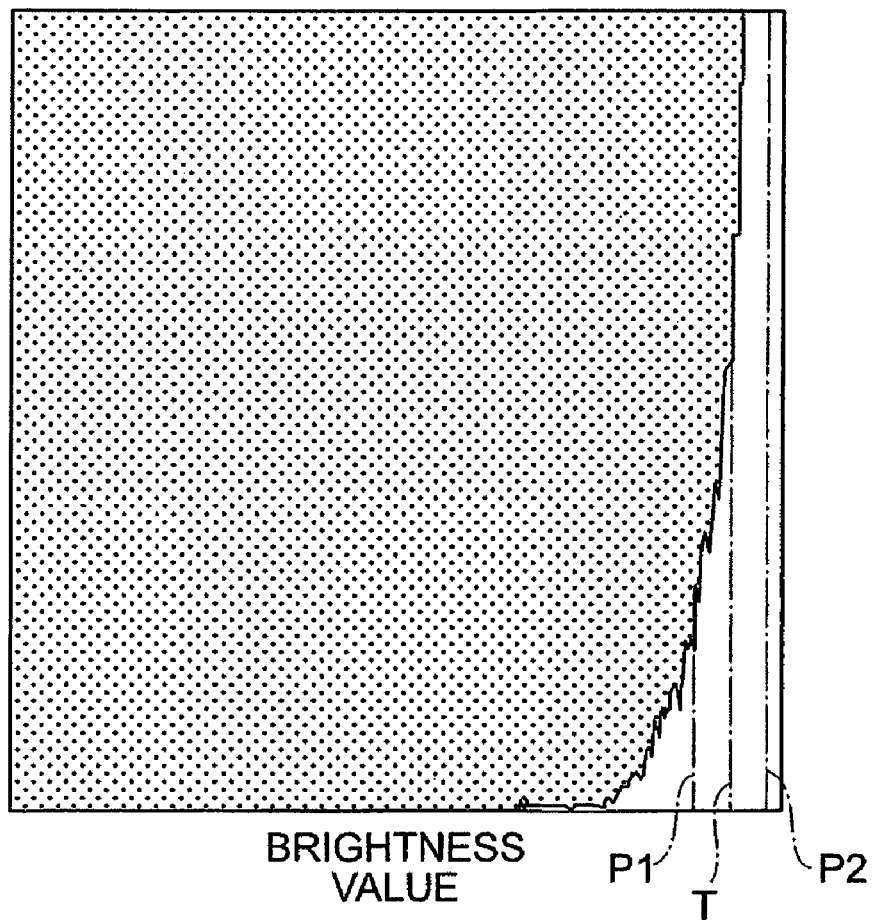
FIG. 4 is a graph showing a method for setting a threshold to binarize a macro image.

FIG. 4 is a graph showing a method for setting a threshold to binarize a macro image. In the graph of FIG. 4, the abscissa axis represents the brightness value in each pixel of a macro image. In the macro image acquired in this embodiment, a region in which only a slide glass is provided without a biological sample L has the highest brightness resulting from the optically transmissible structure of the macro image acquiring unit 20.

To set a threshold with respect to a macro image, it is possible to employ a method in which two peaks P1 and P2 are found in its brightness distribution, for example, as shown in FIG. 4, and a brightness value at the center therebetween is set as a threshold T. Accordingly, ranges in which objects L exist in the image can be easily determined by binarizing the image according to this threshold. Further, a consecutive range greater than a specified area of the determined ranges is set as a range for one object L, and a minimum, rectangular region containing all of the objects L is set as an image acquiring range R. To set such a threshold, various methods can be employed instead of the above method, for example, a threshold may be set at a predetermined, fixed rate with respect to a brightness value of a peak.

When a range in which an object L exists in a binarized macro image is determined, it is preferable to apply erosion processing (processing to reduce a pictorial mass) to the binarized image n times, and then apply dilation processing (processing to enlarge a pictorial mass) to the image n times. As a result, for example, small noises in the image can be removed. It is permissible to further perform a filtering process to remove an edge of a cover glass of a slide or dust in the slide.

The focus measuring position is used, in the micro image acquiring unit 30, when acquiring focus information with respect to the sample S prior to acquisition of the micro image of the sample S. In the micro image acquiring unit 30, focus measurement is performed by using the image pickup device 31 at a set focus measuring position to determine a focus position as focus information on acquisition of the micro image of the sample S. Concerning the focus measuring position, for example, when the inclination of the sample S in a horizontal plane, i.e., a deviation in focal position in a horizontal plane is negligible, only one focus measuring position is set for the sample S.

When there is a need to consider a deviation in focal position in the horizontal plane, it is preferable to set three or more focus measuring positions for the sample S. A two-dimensional focus map with respect to the image acquiring range R of the sample S can be obtained by setting three or more focus measuring positions in this way and then performing focus measurement. For example, when the focus map about focal positions is determined as a planar focal plane, the focal plane can be calculated from a plane including measurement result points at the three focus measuring positions. When four or more focus measuring positions are used, a focal plane can be calculated from their measurement result points according to a fitting technique, such as a least-squares method.

FIG. 3(*b*) shows an example of setting of the focus measuring positions by using a macro image in the case where nine focus measuring positions are automatically set. In this case, the image acquiring range R set in advance for the sample S is equally divided by 3×3=9, and nine focus measuring positions P are set to center points of the respective divided regions.

In this case, eight points of the nine focus measuring positions are initially set points included in the range of the biological sample L as an object of image acquisition, so that they are set as focus measuring positions without change. On the other hand, the lower left point is out of the range of the biological sample L, and it cannot be set as the focus measuring position as it is. Therefore, this lower left focus measuring position may be set to, for example, a position Q determined by a method in which it is moved toward the center of the image acquiring range R. Alternatively, such a position may be excluded from the focus measuring positions.

In the case of determining a focal plane by using the least square method from four or more focus measuring positions, when the focus measuring positions include a measuring position excessively distant from the focal plane determined from the focus measuring positions, it is preferable that a focal plane is re-determined by excluding this distant measuring position. When the focal plane cannot be normally determined, it is preferable that the object is regarded as dust and excluded.

As in the example described above, when the sample S is a slide, as the image pickup conditions for acquiring a micro image, preferably, first, an image acquiring range R including a biological sample L and a predetermined number of focus measuring positions P are set as the image pickup conditions of a micro image by referring to a macro image acquired by the macro image acquiring unit 20. Thereafter, in the micro image acquiring unit 30, focus information concerning the focal position or the focal plane with respect to the sample S is acquired based on the focus measuring positions P, and the micro image of the sample S is then acquired based on the thus obtained focus information and the set image acquiring range R.

For setting the image acquiring range R and the focus measuring positions P by using the macro image of the sample S, in detail, various methods may be used as well as the example shown in FIG. 3(b). For example, FIG. 3(b) shows an example in which the focus measuring positions P are set automatically by using a predetermined setting algorithm, however, to manually set the focus measuring positions, focus measuring positions with an appropriate number and arrangement may be set after an operator confirms the macro image.

Figure 5:
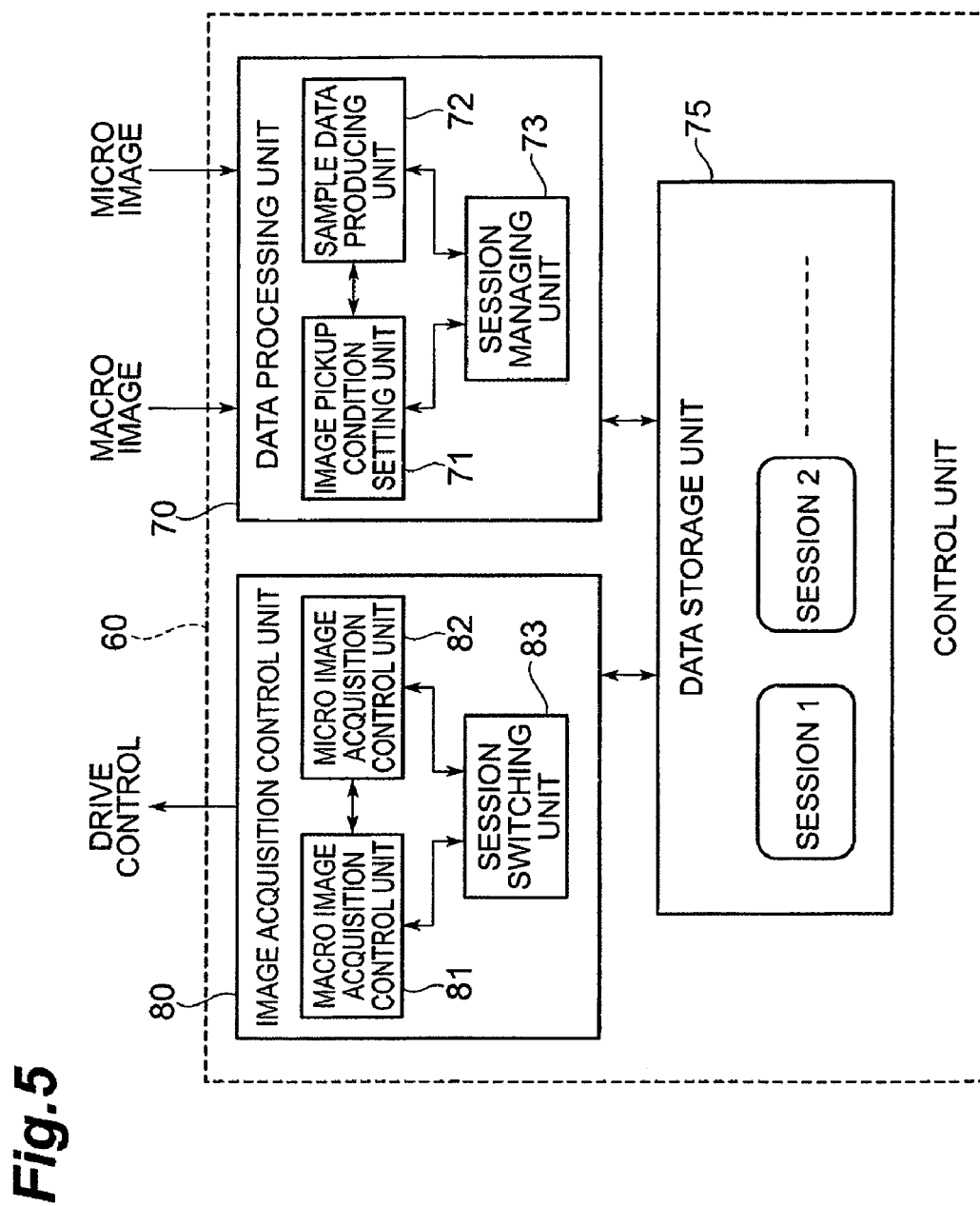
FIG. 5 is a block diagram showing a structure of a control unit of the image acquiring apparatus.

Next, a description will be given of a structure of the control unit 60 of the image acquiring apparatus shown in FIG. 1. FIG. 5 is a block diagram showing the structure of control unit 60. As shown in FIG. 5, the control unit 60 according to this embodiment is made up of the data processing unit 70, the data storage unit 75, and the image acquisition control unit 80.

The data processing unit 70 includes an image pickup condition setting unit 71, a sample data producing unit 72, and a session managing unit 73. The image pickup condition setting unit 71 is a setting means for setting an image pickup condition for the micro image while referring to the macro image acquired by the macro image acquiring unit 20 of the microscope unit 10. The sample data producing unit 72 produces sample data that is image data concerning the sample S by using the micro image acquired by the micro image acquiring unit 30. The session managing unit 73 performs, for example, image data management that uses a session defined according to a sample group set in the sample storage unit 11.

Figure 6:
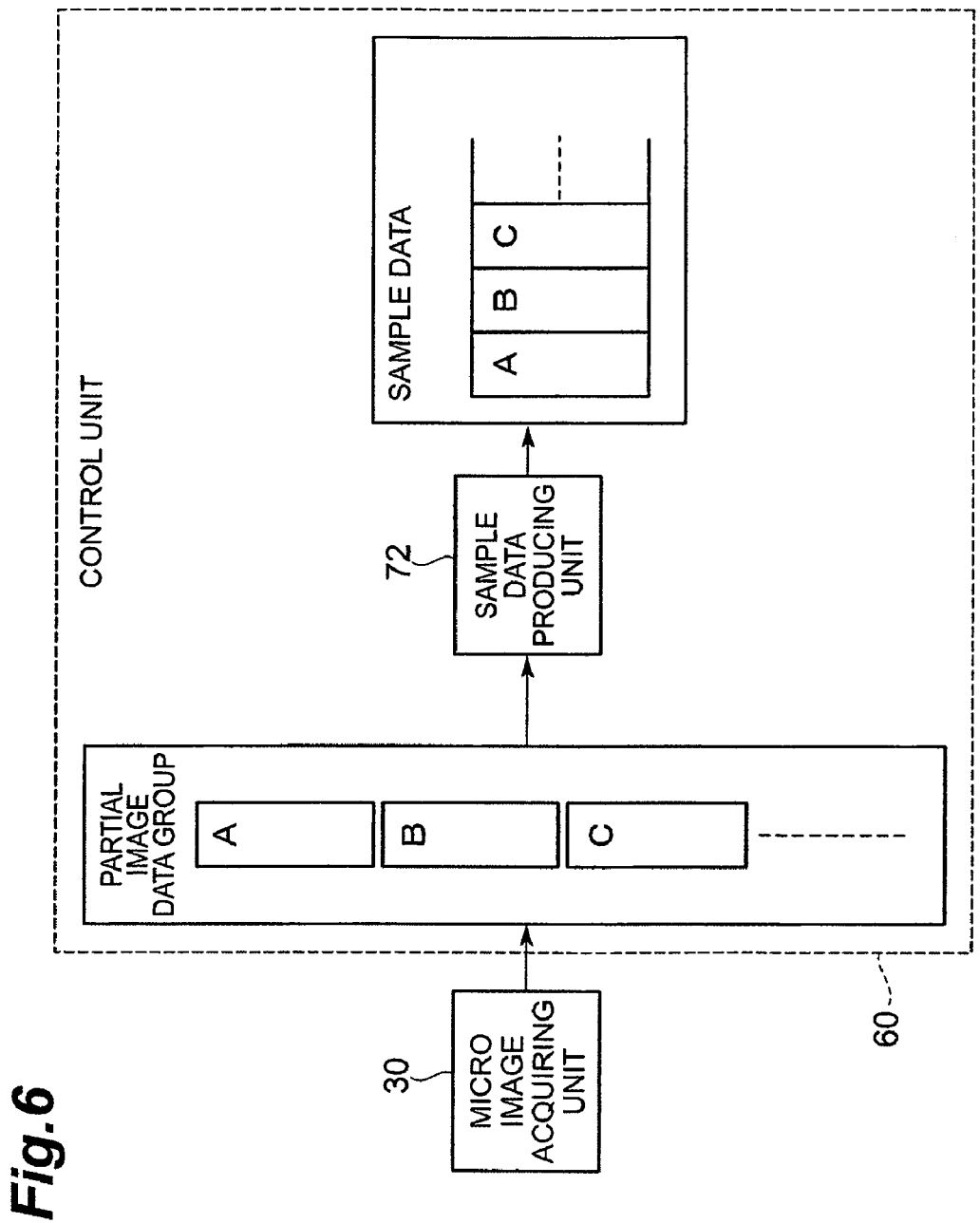
FIG. 6 is a schematic view explaining the production of sample data using a micro image.

FIG. 6 is a schematic view for explaining the production of sample data while using the micro image. Herein, an image data group of strip-like partial images A, B, C, ... is input to the control unit 60 as image data of the micro images acquired by the micro image acquiring unit 30 of the microscope unit 10 (see FIG. 3(a)). The sample data producing unit 72 arranges and combines these partial images together, and produces image data of a micro image with respect to the whole of the sample S so as to be sample data. For example, this sample data can be used as image data for the virtual microscope. The image data of the sample S may be subjected to data compression according to need. The image data input from the microscope unit 10 and the sample data produced by the sample data producing unit 72 are stored in the data storage unit 75 according to need.

The image acquisition control unit 80 includes a macro image acquisition control unit 81, a micro image acquisition control unit 82, and a session switching unit 83. The macro image acquisition control unit 81 controls an operation to acquire a macro image of the sample S by means of the macro image acquiring unit 20. The micro image acquisition control unit 82 controls an operation to acquire a micro image by means of the micro image acquiring unit 30. The session switching unit 83 controls session switching according to a sample group.

According to the control mode selected for image acquisition processing, the image acquisition control units 81 and 82 control an operation to acquire a macro image and an operation to acquire a micro image of the sample S, respectively, and the image pickup condition setting unit 71 sets an image pickup condition. In this embodiment, the number of control modes provided in the control unit 60 is three, i.e., a full-automatic mode, a manual mode, and a semi-automatic mode.

Figure 7:
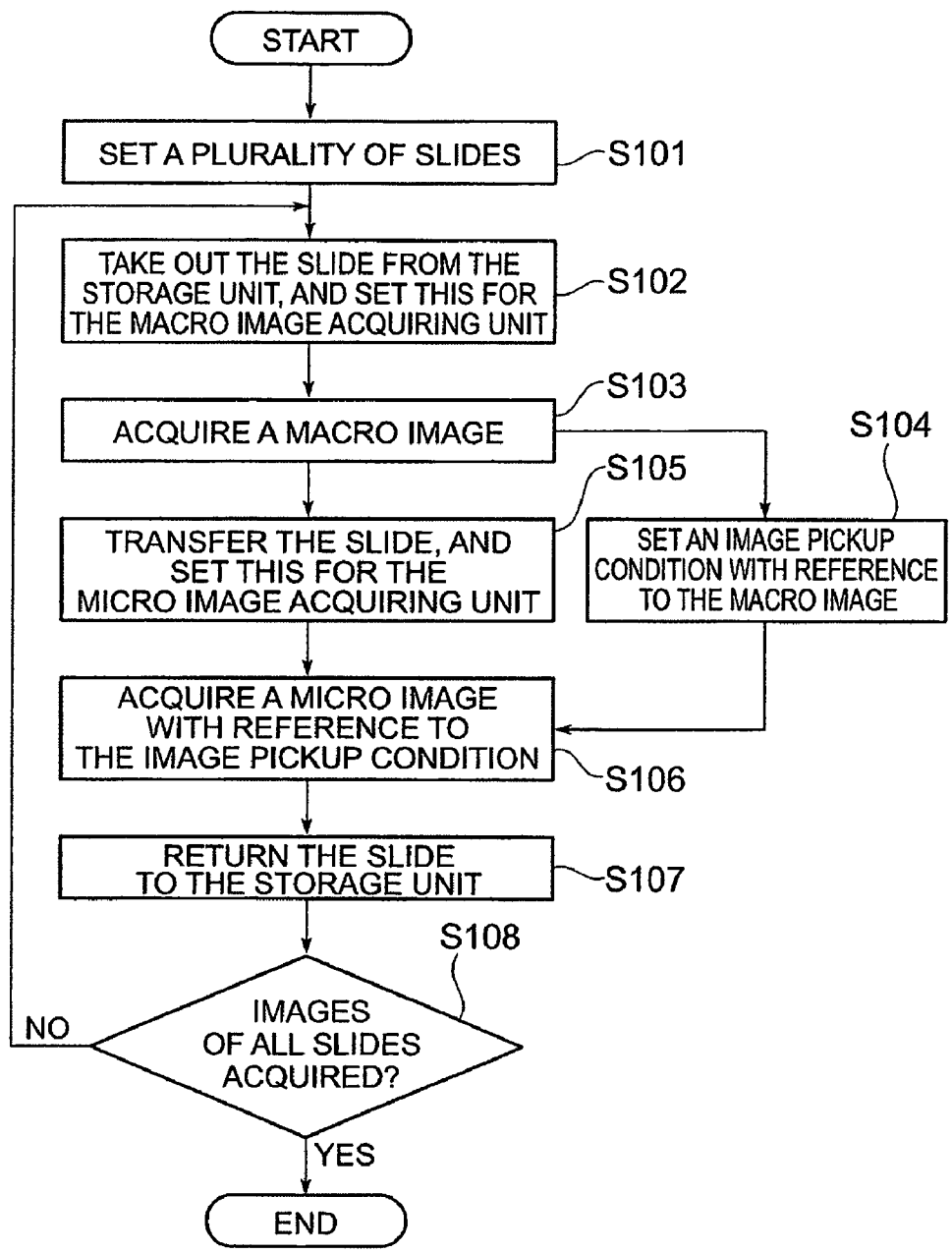
FIG. 7 is a flowchart showing an image acquiring method performed in a full-automatic mode.

FIG. 7 is a flowchart showing an image acquiring method according to the full-automatic mode. In the full-automatic mode, the macro image acquisition control unit 81 of the control unit 60 performs macro image acquisition control by placing the sample S from a storage position in the sample storage unit 11 at an image acquiring position for the macro image acquiring unit 20 (macro image acquisition control step). With respect to the sample S whose macro image has been acquired, the image pickup condition setting unit 71 automatically sets an image pickup condition for a micro image corresponding to the macro image (image pickup condition setting step). The micro image acquisition control unit 82 performs micro image acquisition control by placing the sample S whose image pickup condition has been set at an image acquiring position for the micro image acquiring unit 30 while referring to the image pickup condition (micro image acquisition control step).

In an example shown in FIG. 7, first, an operator sets a plurality of slides S, which are objects for image acquisition, in the sample storage unit 11 of the microscope unit 10, and then closes a door 12 (step S101). The number of slides that can be stored in the sample storage unit 11 is, for example, several hundred, depending on a specific structure of an apparatus.

Thereafter, one of the slides S that is an object for image acquisition is taken out from the sample storage unit 11, is then transferred by the sample transfer unit 14, placed on the sample stage 15, and is set at the image acquiring position for the macro image acquiring unit 20 (see FIG. 1 and FIG. 2) (S102). Thereafter, the image pickup device 21 of the image acquiring unit 20 acquires a macro image of the slide S including the biological sample L (S103, macro image acquiring step). In the image pickup condition setting unit 71 of the control unit 60, an image acquiring range R and a plurality of focus measuring positions P, which are image pickup conditions for the slide S, are automatically set by use of predetermined algorithm while referring to the macro image acquired above (S104, image pickup condition setting step).

The slide S that has completed the macro image acquisition is moved from the image acquiring position for the macro image acquiring unit 20 by means of the sample transfer unit 14 or the sample stage 15, and is set at an image acquiring position for the micro image acquiring unit 30 (S105). Thereafter, the image pickup device 31 of the image acquiring unit 30 acquires a micro image of the slide S while referring to the image pickup conditions set by the image pickup condition setting unit 71 (S106, micro image acquiring step).

In more detail, concerning each of the focus measuring positions P set with respect to the slide S, focus measurement is first performed in the micro image acquiring unit 30, and a focal plane, which serves as focus information most suitable to acquire an image of the biological sample L, is calculated from the obtained focal positions. Then, the slide S is two-dimensionally scanned by the image pickup device 31 for the image acquiring range R while performing focus control based on the obtained focal plane, thus acquiring a plurality of strip-like partial images. The partial images are processed into a high-resolution micro image of the slide S (a digital slide in the virtual microscope) by being subjected to predetermined data combine processing by the sample data producing unit 72 of the control unit 60.

Thereafter, the slide S that has completed the micro image acquisition is returned from the image acquiring position for the micro image acquiring unit 30 to the storage position for the sample storage unit 11 by means of the sample transfer unit 14 (S107). Thereafter, in the image acquisition control unit 80, a confirmation is made of whether all of the slides S have undergone the image acquisition processing or not (S108). If there is a slide S to be subjected to the image acquisition processing here, steps S102 to S107 mentioned above are repeatedly performed. If all of the slides S have undergone the image acquisition processing, image acquisition with respect to the slides S set in the sample storage unit 11 is ended.

The image acquisition procedure according to the manual mode is performed basically in the same way as the image acquisition procedure according to the full-automatic mode, except that each step is manually performed under instructions from the operator. However, in the manual mode, it is permissible to automatically perform a step at which instructions from the operator are unnecessary, such as a step at which the slide S that has completed macro image acquisition is moved to the image acquiring position for the micro image acquiring unit 30. Additionally, concerning the acquisition of the micro image of the slide S, it is permissible to form a structure in which the image pickup condition can be reset or a micro image can be re-acquired if a problem occurs by allowing the operator to confirm the acquired micro image.

Figure 8:
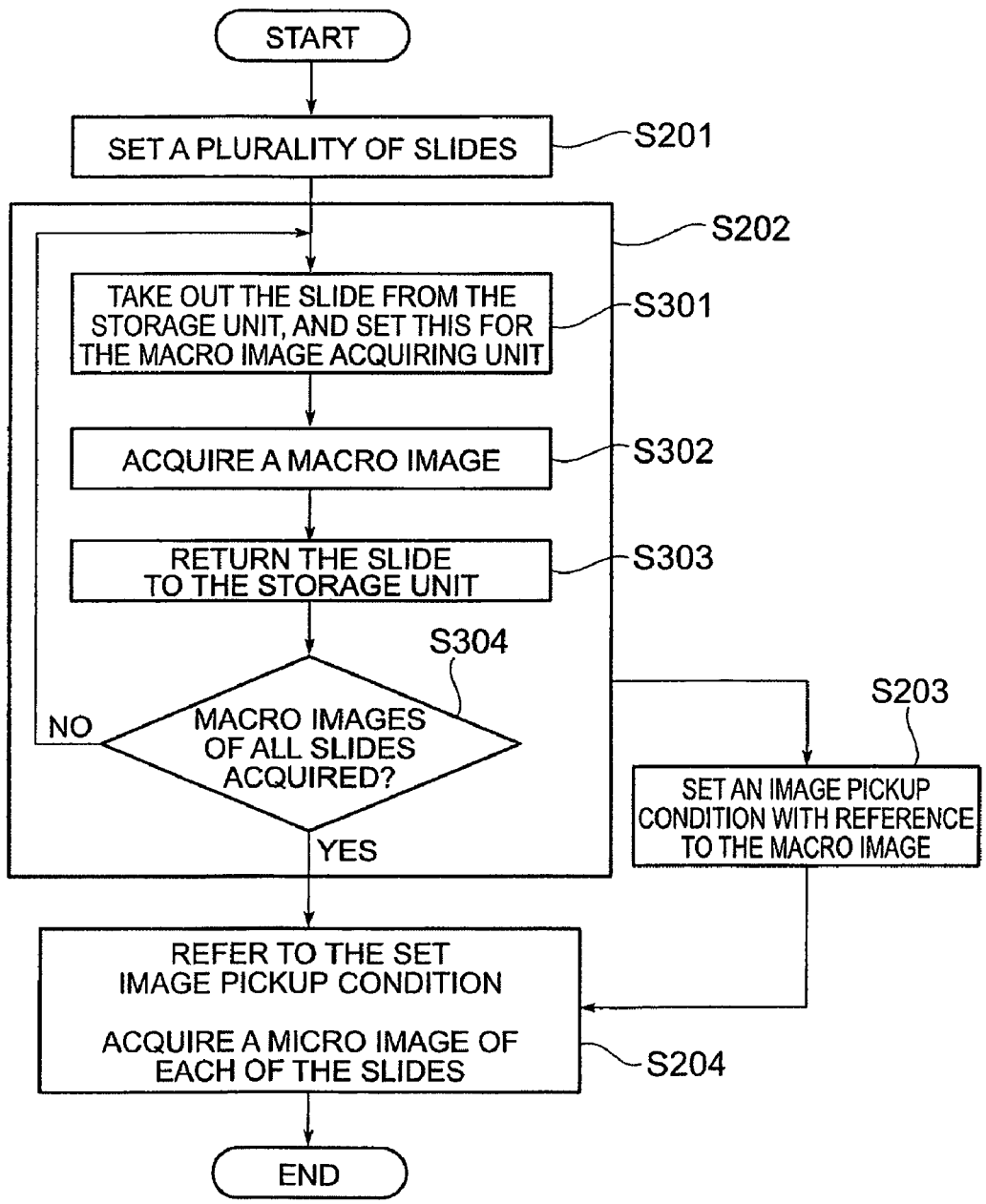
FIG. 8 is a flowchart showing an image acquiring method performed in a semi-automatic mode.
Figure 9:
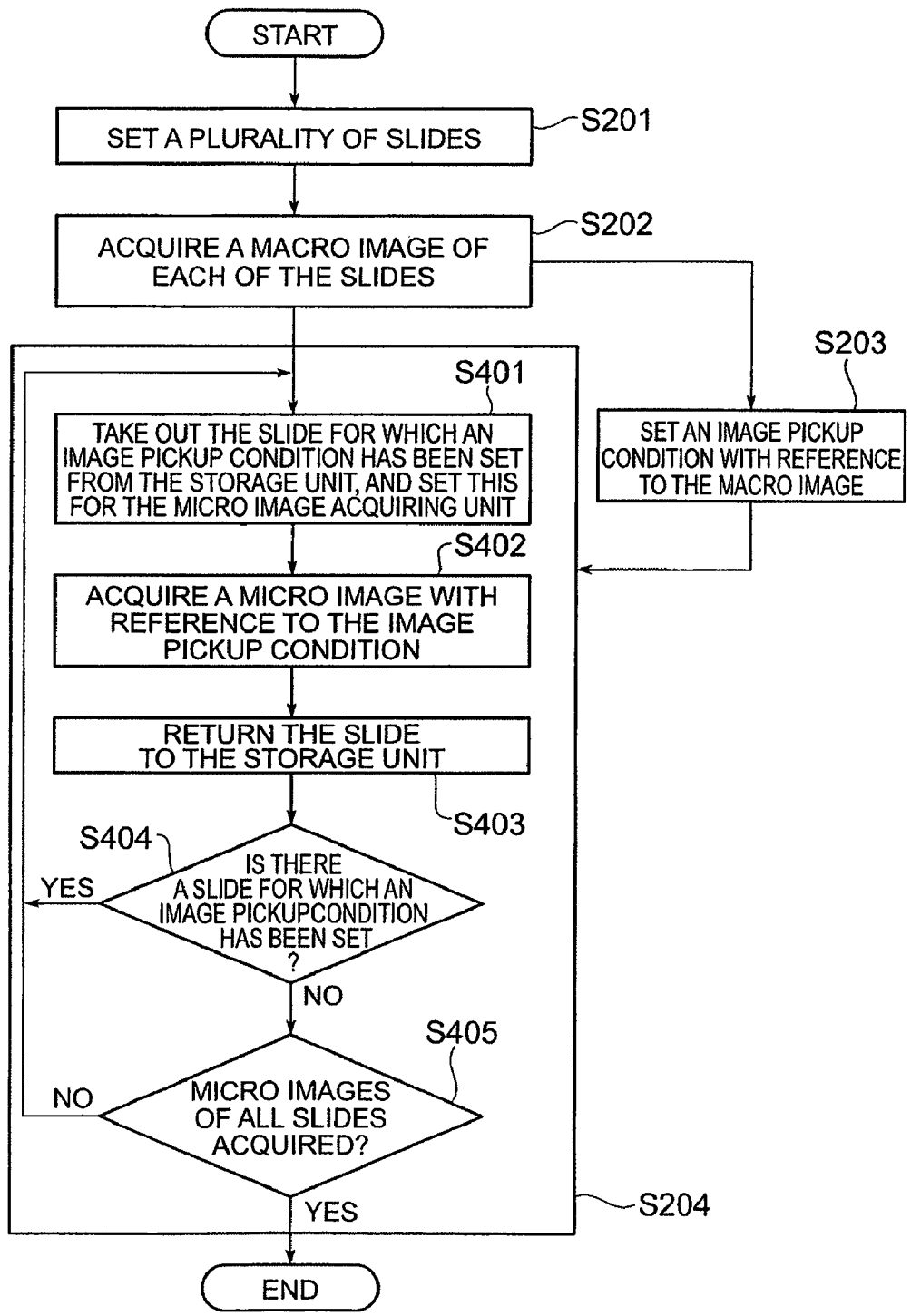
FIG. 9 is a flowchart showing an image acquiring method performed in the semi-automatic mode.

FIG. 8 and FIG. 9 are flowcharts, each showing an image acquiring method according to a semi-automatic mode. In the semi-automatic mode, the macro image acquisition control unit 81 of the control unit 60 places each of a plurality of samples S from the storage position in the sample storage unit 11 at an image acquiring position for the macro image acquiring unit 20 so as to acquire a macro image, and then performs control to place the sample S at a standby position (macro image acquisition control step). With respect to the sample S whose macro image has been acquired, the image pickup condition setting unit 71 allows the operator to confirm the macro image and a corresponding image pickup condition, and sets an image pickup condition for a micro image (image pickup condition setting step). The micro image acquisition control unit 82 places the sample S that has been placed at the standby position and for which the image pickup condition has been set at an image acquiring position for the micro image acquiring unit 30, and performs micro image acquisition control while referring to the image pickup condition (micro image acquiring control step). In this embodiment, the standby position of the sample S is set at the storage position in the sample storage unit 11.

In an example shown in FIG. 8 and FIG. 9, first, the operator sets a plurality of slides S, which are objects for image acquisition, in the sample storage unit 11 of the microscope unit 10 in the same way as in the full-automatic mode, and then closes the door 12 (step S201).

Thereafter, the macro image acquisition control unit 81 acquires a macro image of each of the slides S (S202, macro image acquiring step). In more detail, as shown in FIG. 8, one of the slides S that is an object whose image is acquired is taken out from the storage position in the sample storage unit 11, is then transferred by the sample transfer unit 14, placed on the sample stage 15, and is set at an image acquiring position for the macro image acquiring unit 20 (S301). Thereafter, the image pickup device 21 of the image acquiring unit 20 acquires a macro image of the slide S including the biological sample L (S302).

The slide S that has completed the macro image acquisition is returned from the image acquiring position for the macro image acquiring unit 20 to the storage position, which is also its standby position, in the sample storage unit 11 by means of the sample transfer unit 14 (S303). Thereafter, in the macro image acquisition control unit 81, a confirmation is made of whether all of the slides S have undergone the macro image acquisition processing or not (S304). If there is a slide S to be subjected to the macro image acquisition processing here, steps S301 to S303 mentioned above are repeatedly performed. If all of the slides S have undergone the macro image acquisition processing, macro image acquisition with respect to the slides S set in the sample storage unit 11 is ended.

In this mode, after the macro image of the first slide S is acquired, an image pickup condition for a micro image is set in parallel with the macro image acquisition processing (S203, image pickup condition setting step). In the image pickup condition setting unit 71 of the control unit 60, concerning a slide S for which an image pickup condition is set, an operator is allowed to confirm the macro image acquired above and the corresponding image pickup condition, and then an image acquiring range R and a plurality of focus measuring positions P, which are image pickup conditions to acquire a micro image, are set. These image pickup conditions are confirmed and set by use of, for example, an operation screen displayed on the display device 61 in the structure of FIG. 1.

In an example of an image pickup condition setting method, first, a list of slides S the macro image of each of which has been acquired is displayed together with thumbnail images, and a slide S for which an image pickup condition is set is selected from the slide list. Thereafter, a macro image of the selected slide S is displayed, and an operator confirms this macro image, and selects whether to set the image pickup condition automatically or manually. If automatic setting is selected, the image pickup condition is automatically set, the setting of the image pickup condition for the slide is then completed, and the process proceeds to a next step where a next slide is selected, and the image pickup condition is set.

If manual setting is selected, the operator manually sets an image acquiring range R and a focus measuring position P with respect to the macro image of the slide in consideration of the range where a biological sample L exists, the shape thereof, etc. If there is a slide S for which an image pickup condition is set after the setting of the image pickup condition is ended, the step mentioned above is repeatedly performed. If the setting of the image pickup conditions for all of the slides S is completed, the setting of the image pickup conditions for the slides S set in the sample storage unit 11 is ended.

After all of the slides S complete the macro image acquisition processing, the micro image acquisition control unit 82 acquires a micro image of each of the slides S in parallel with a process for setting an image pickup condition (S204, micro image acquiring step). In more detail, as shown in FIG. 9, one of the slides S for which an image pickup condition has already been set is selected, and is used as a slide S for image acquisition. The slide S selected therefrom is taken out from the storage position, which is also its standby position in the sample storage unit 11, is then transferred by the sample transfer unit 14, placed on the sample stage 15, and is set at an image acquiring position for the micro image acquiring unit 30 (S401). Thereafter, the image pickup device 31 of the image acquiring unit 30 acquires a micro image of the slide S while referring to the image pickup condition set by the image pickup condition setting unit 71 (S402). The method for acquiring the micro image is carried out basically in the same way as in the full-automatic mode.

Thereafter, the slide S that has completed the micro image acquisition is returned from the image acquiring position for the micro image acquiring unit 30 to the storage position in the sample storage unit 11 by means of the sample transfer unit 14 (S403). Thereafter, in the micro image acquisition control unit 82, a confirmation is made of whether an image pickup condition is to be set for one of the slides S (S404). If there is still a slide S for which an image pickup condition is set and which is subjected to image acquisition processing, steps S401 to S403 mentioned above are repeatedly performed.

If there is not a slide S for which an image pickup condition has been set, in the micro image acquisition control unit 82, a confirmation is further made of whether one of the slides S has already completed undergoing the image acquisition processing or not (S405). If there is a slide S to be further subjected to image acquisition processing here, steps S401 to S403 mentioned above are repeatedly performed while waiting for an image pickup condition to be set. If all of the slides S have completed undergoing the image acquisition processing, image acquisition with respect to the slides S set in the sample storage unit 11 is ended.

Next, a description will be given of the management of the image acquisition processing that uses sessions in the control unit 60 of the image acquiring apparatus. As described above, in the image acquiring apparatus according to this embodiment, a session is defined in accordance with a sample group consisting of a plurality of samples S set in the sample storage unit 11. In the session managing unit 73 of the control unit 60, a data group including data of the macro image and the image pickup condition concerning each of the samples S is managed as session data associated with the sample group for each session.

The image acquiring apparatus shown in FIG. 1 includes a macro image acquiring unit 20 and a micro image acquiring unit 30 each of which serves as an image acquiring unit for the sample S. According to this structure, in the session managing unit 73, a data group including macro image data, an image pickup condition, and micro image data concerning each of the samples S is managed as session data. If there is another piece of data, such as focus information acquired based on a focus measuring position that is an image pickup condition, besides the pieces of data mentioned above, it is preferable to manage data including such data as session data.

The session data is stored and kept in the data storage unit 75 according to need. In the data storage unit 75 of FIG. 5, a case in which session data concerning a plurality of sessions consisting of session 1, session 2, . . . is stored is shown as an example of the data management. The plurality of sessions can be managed together by introducing the concept of a session in which a sample group and a data group are associated with each other.

The control unit 60 shown in FIG. 5 has a session switching unit 83, in addition to the session managing unit 73. The session switching unit 83 controls switching between the sessions in a state in which the sample group set in the sample storage unit 11 and the session data managed by the session managing unit 73 are associated with each other for each session. The session switching is performed either manually in accordance with instructions from the operator or automatically if necessary.

In the image acquiring apparatus shown in FIG. 1, the sample storage unit 11 is provided with an interlock mechanism 13 that prevents the door 12 of the sample storage unit 11 from being opened during execution of the session. According to this structure, the session switching unit 83 of the control unit 60 performs the ON/OFF control of interlocking in the sample storage unit 11, in addition to the control of session switching. The interlock mechanism 13 is formed of, for example, a locking mechanism using a solenoid.

Figure 10:
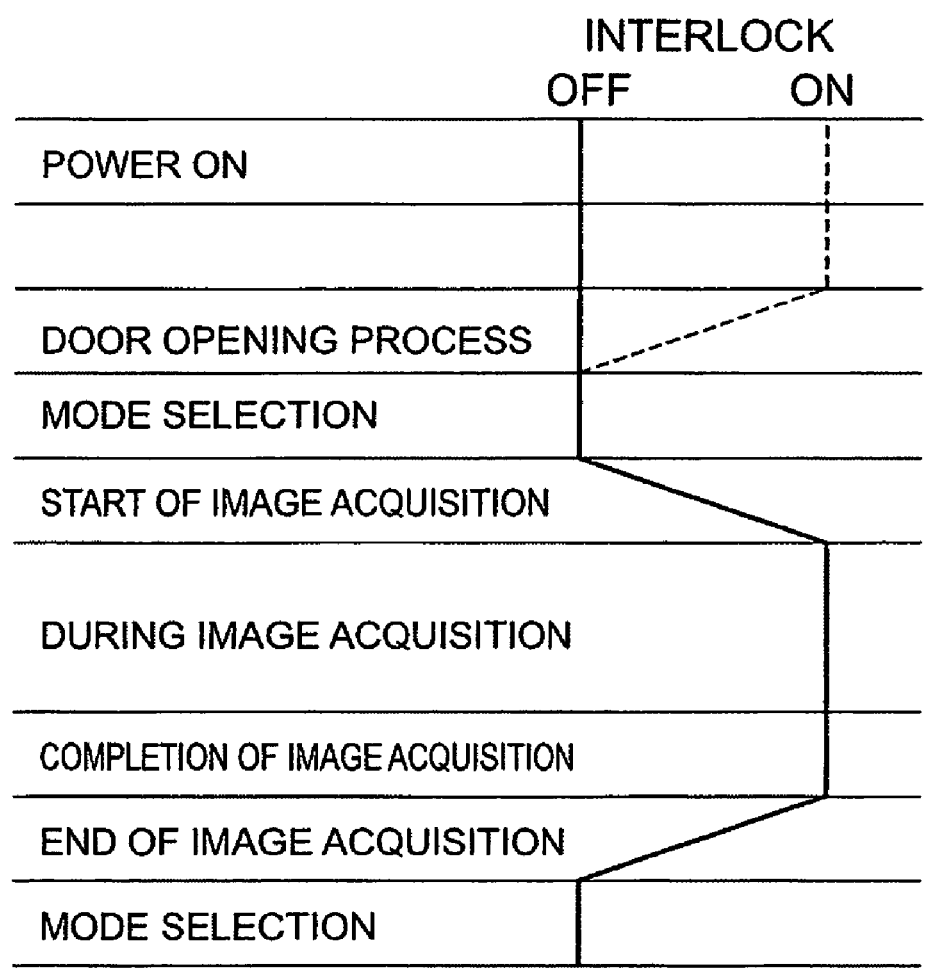
FIG. 10 is a figure showing an example of interlocking control in a sample storage unit.

FIG. 10 shows an example of the interlocking control in the sample storage unit 11 by the session switching unit 83. When the image acquiring apparatus is powered on, the interlock mechanism 13 of the sample storage unit 11 is normally in an OFF state as shown by the solid line. However, for example, if the process is ended abnormally in the last use of the apparatus, the interlock mechanism will be sometimes in an ON state as shown by the dashed line. Therefore, after having been powered on, a door opening operation is performed automatically or manually if necessary, so that the interlocking state in the sample storage unit 11 reliably reaches an OFF state.

Thereafter, the operator selects an image acquisition mode. The operator further opens the door 12 of the sample storage unit 11, sets a sample group consisting of a plurality of samples S of objects of image acquisition in the sample storage unit 11, and thereafter, the operator closes the door 12. In this state, the operator instructs the control unit 60 to start image acquisition, and thereupon, the session switching unit 83 starts a session corresponding to the sample group, and instructs the sample storage unit 11 so that the interlock mechanism 13 performs an interlocking operation. Accordingly, the interlocking state in the sample storage unit 11 is changed to an ON state, and this ON state of interlocking is maintained during image acquisition without being changed.

When image acquisition with respect to the sample group stored in the sample storage unit 11 is completed, and the operator instructs the control unit 60 to end the image acquisition, the session switching unit 83 ends the session, and instructs the sample storage unit 11 to undo the interlocking by the interlock mechanism 13. Accordingly, the interlocking state in the sample storage unit 11 is changed to an OFF state, so that the door 12 can be opened, and, for example, the sample group can be replaced with another by the operator.

Session management and switching in the control unit 60 will be described specifically. FIG. 11 to FIG. 15 show examples of an operation screen used in session management and switching. These operation screens are displayed on the display device 61 in the structure of FIG. 1.

Figure 11:
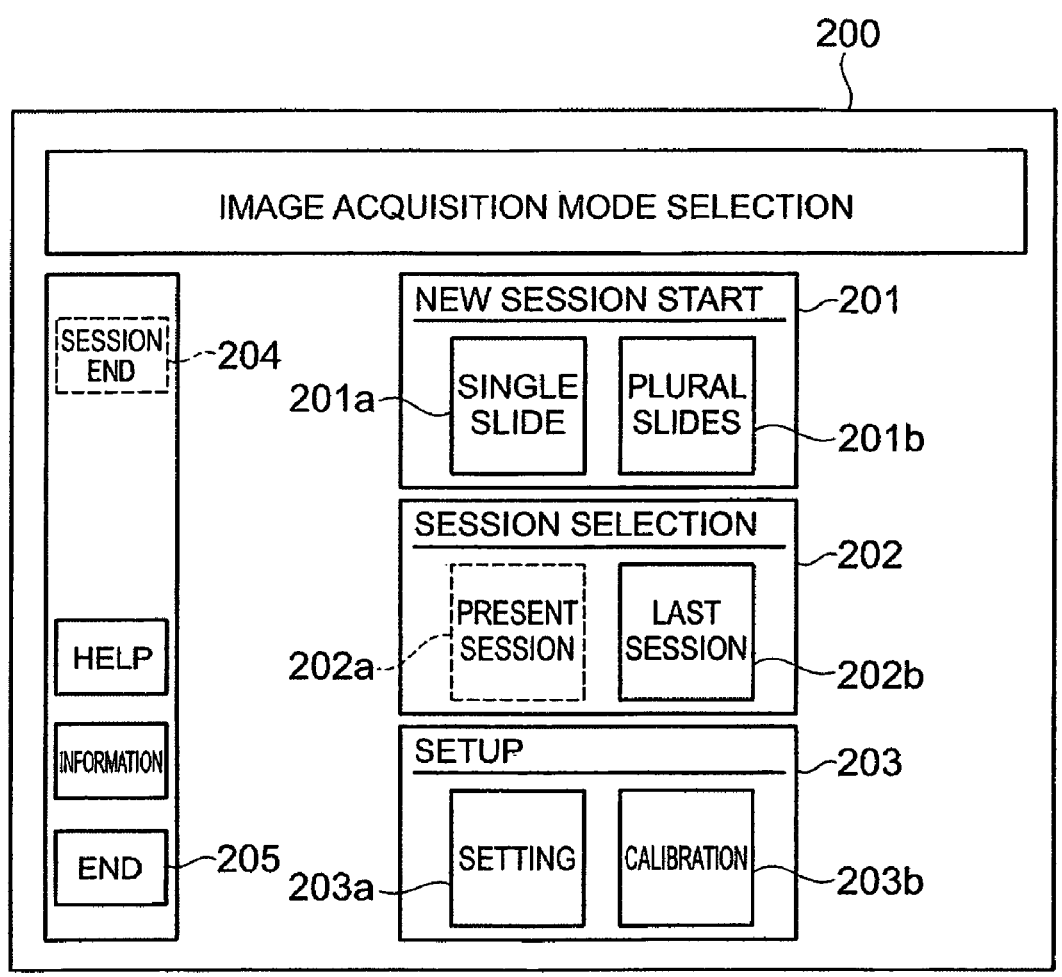
FIG. 11 is a figure showing an example of an operation screen used for session management and switching.

When the image acquiring apparatus is powered on, and the apparatus initialization, such as the door opening process, is ended, a mode selection screen 200 shown in FIG. 11 is displayed on the display device 61. A new session start portion 201, a session selection portion 202, and a setup portion 203 are displayed on the mode selection screen 200. In addition, a session end button 204 used to end a session being executed and an end button 205 used to end an application program for image acquisition processing are displayed on the screen 200. It should be noted that, since a session is not being executed at this time, the session end button 204 is in an inoperable state (hereinafter, this inoperable state is shown by the dashed line in the figures).

The new session start portion 201 consists of a single slide mode selection button 201a and a plural slides mode selection button 201b. When image acquisition is performed with respect to a sample group consisting of a plurality of slides S, the selection button 201b is clicked to select a plural slides mode. In this example, when image acquisition only of a single slide S is performed, a single slide mode can be selected by clicking the selection button 201a. The single slide mode is useful, for example, in a case in which a session concerning a plurality of slides S is paused, and image acquisition of a single slide S is performed by interruption.

The session selection portion 202 consists of a present session selection button 202a and a last session selection button 202b. For selecting an existing session in which session data is stored in the data storage unit 75 of the control unit 60, not a new session, this session selection portion 202 is operated. At this time, there is no present session at the stage where the apparatus is initialized, therefore, the present session selection button 202a is in an inoperable state, and only the last session can be selected by the selection button 202b.

The setup portion 203 consists of a setting button 203a and a calibration button 203b. The setup portion 203 is operated when there is a need to confirm or change various setting in the image acquiring apparatus.

When the mode selection screen 200 gives a instruction to start a new session or restart an existing session, the session switching unit 83 brings the interlocking of the sample storage unit 11 into an ON state so as to start a session with respect to a sample group. Further, the session switching unit 83 instructs the session managing unit 73 to perform switching to an existing session in which session data is kept or to a new session so as to be used as a session corresponding to the sample group set in the sample storage unit 11. The existing session or the new session is selected in accordance with the instructions given from the operator in the mode selection screen 200.

Figure 12:
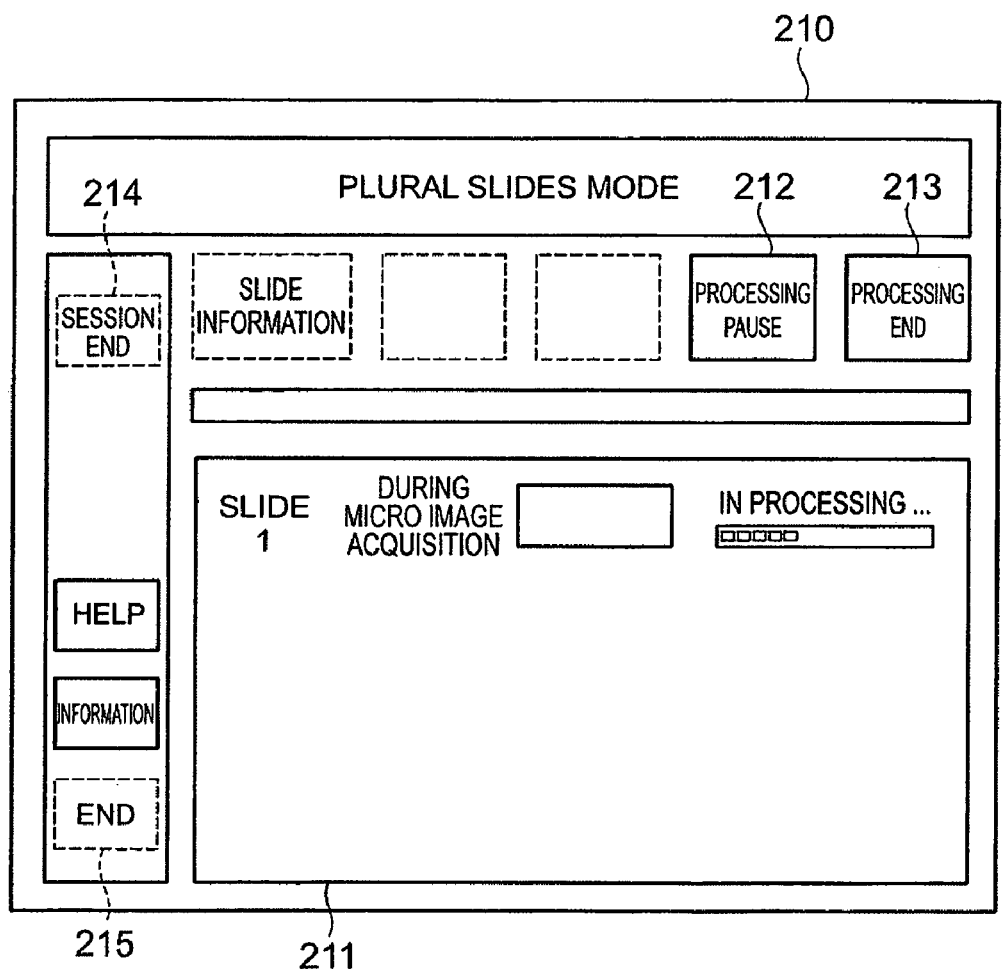
FIG. 12 is a figure showing an example of an operation screen used for session management and switching.

FIG. 12 shows an example of an operation screen appearing while the plural slides mode is being executed. In this processing execution screen 210, the progress (i.e., session execution status) of the image acquisition processing with respect to the sample group is displayed on a processing status display portion 211. FIG. 12 shows a state of performing a micro image acquisition processing with respect to one of the slides S, i.e., with respect to slide 1.

In the screen 210 of FIG. 12, a processing pause button 212 used to pause an image acquisition processing being performed and a processing end button 213 used to abort the image acquisition processing are operable in accordance with the fact that the image acquisition processing is being executed. When the processing pause button 212 is clicked, the process is allowed to pause at the time point where the micro image acquisition processing being currently performed is terminated. When the processing end button 213 is clicked, the process is instantly aborted at that time. As on the screen 200 of FIG. 11, a session end button 214 and an end button 215 are displayed on the screen 210. However, since the micro image acquisition processing is being performed, these buttons 214 and 215 are inoperable.

Figure 13:
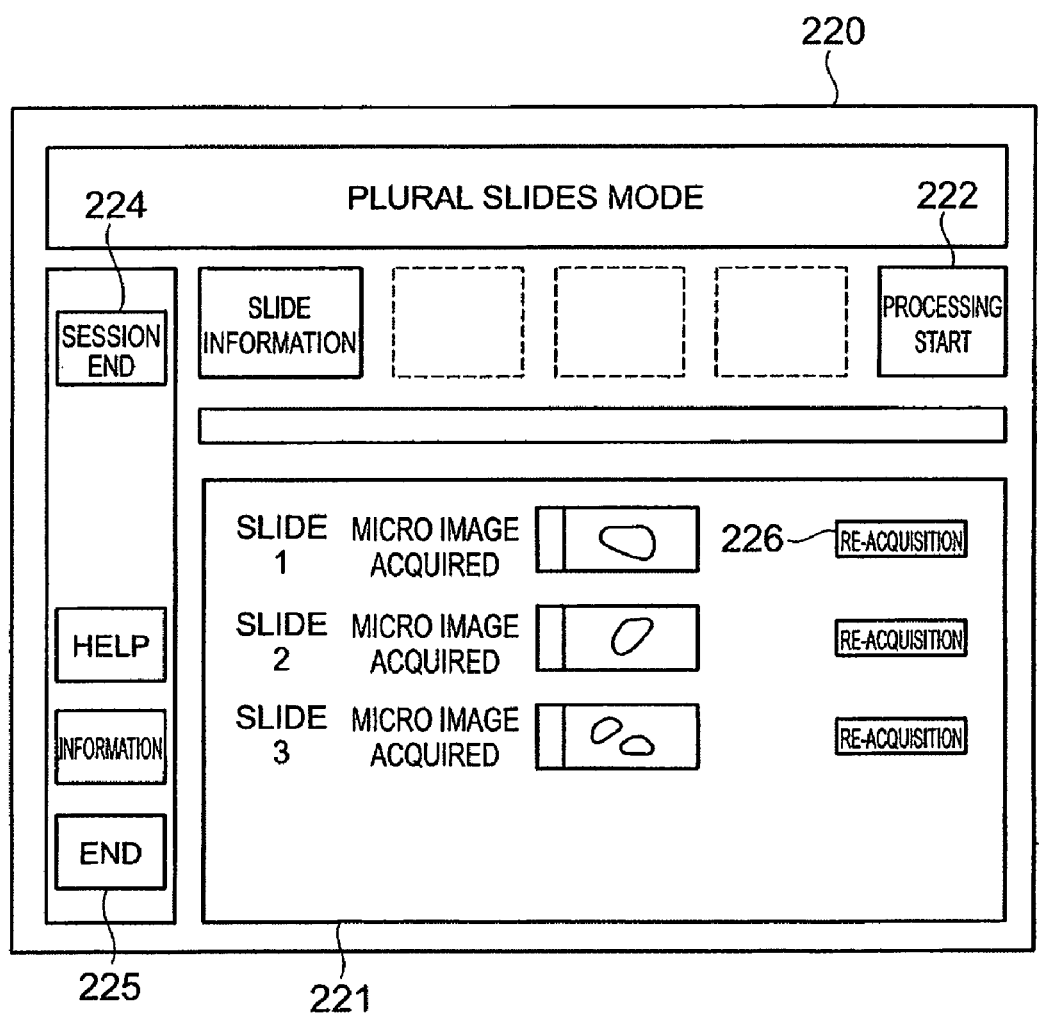
FIG. 13 is a figure showing an example of an operation screen used for session management and switching.

FIG. 13 shows another example of the operation screen appearing while the plural slides mode is being executed. In the processing execution screen 220, the progress of the image acquisition processing is displayed on the processing status display portion 221, as in the screen 210 of FIG. 12. FIG. 13 shows a state in which micro image acquisition processing with respect to slide 1 to slide 3 of slides S has been completed.

In the screen 220 of FIG. 13, a processing start button 222 used to start the next process is operable. As on the screen 200 of FIG. 11, a session end button 224 and an end button 225 are displayed on the screen 220. At this point, there is no image acquisition processing being performed, and hence these buttons 224 and 225 are operable.

For example, if slide 1 to slide 3 displayed on the processing status display portion 221 are all of the slides of the sample group, a session in which the image acquisition processing has been completed can be terminated by clicking the session end button 224. If the sample group includes other slides excluding slide 1 to slide 3, this session can be paused at the middle of the process by clicking the session end button 224.

Figure 14:
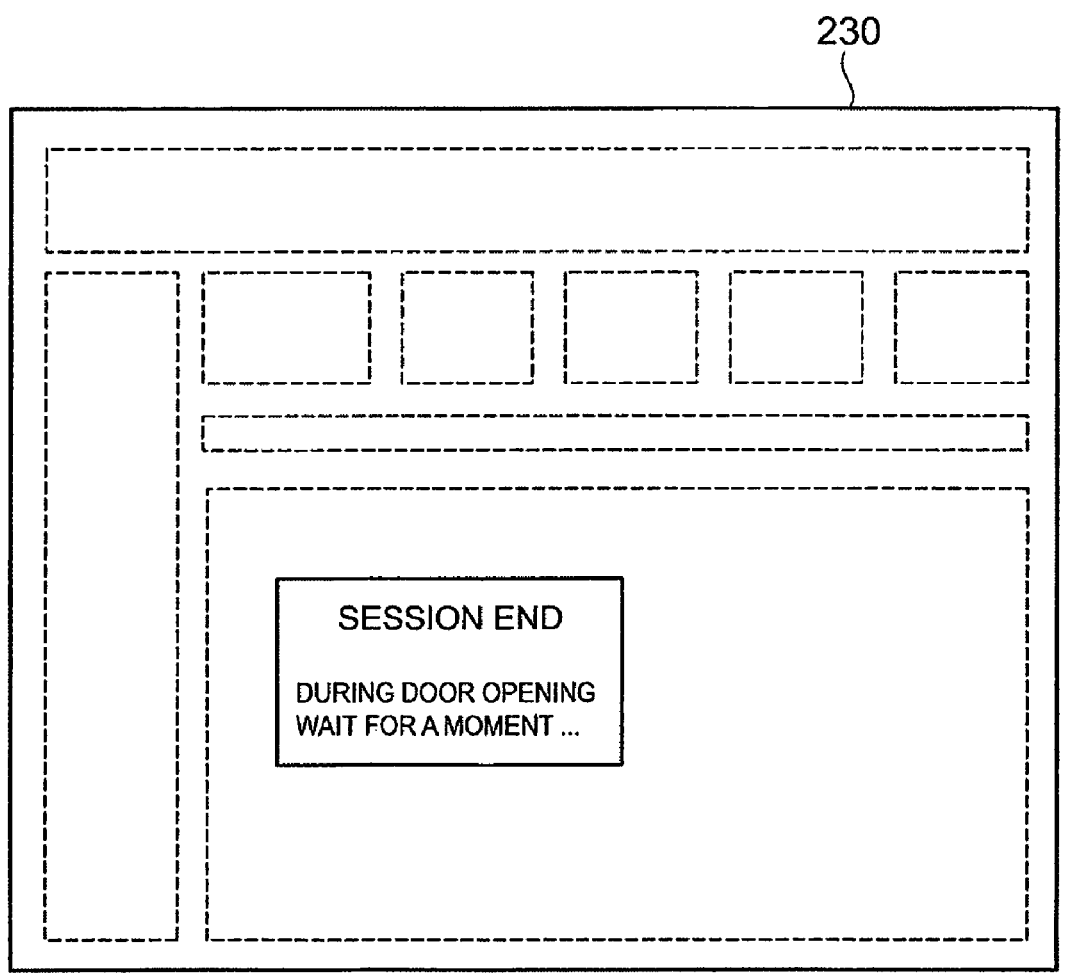
FIG. 14 is a figure showing an example of an operation screen used for session management and switching.

When the session is paused or ended in this way, the session switching unit 83 instructs the session managing unit 73 to store session data acquired or set in the session (i.e., data of macro images, image pickup conditions, micro images, etc.) in the data storage unit 75. Simultaneously with the instruction to store the session data, the session switching unit 83 instructs the sample storage unit 11 to undo the interlocking by the interlock mechanism 13 so as to bring the interlocking of the sample storage unit 11 into an OFF state, thus pausing or ending the session with respect to the sample group. At this time, a session end screen 230, such as that of FIG. 14, is displayed on the display device 61.

Figure 15:
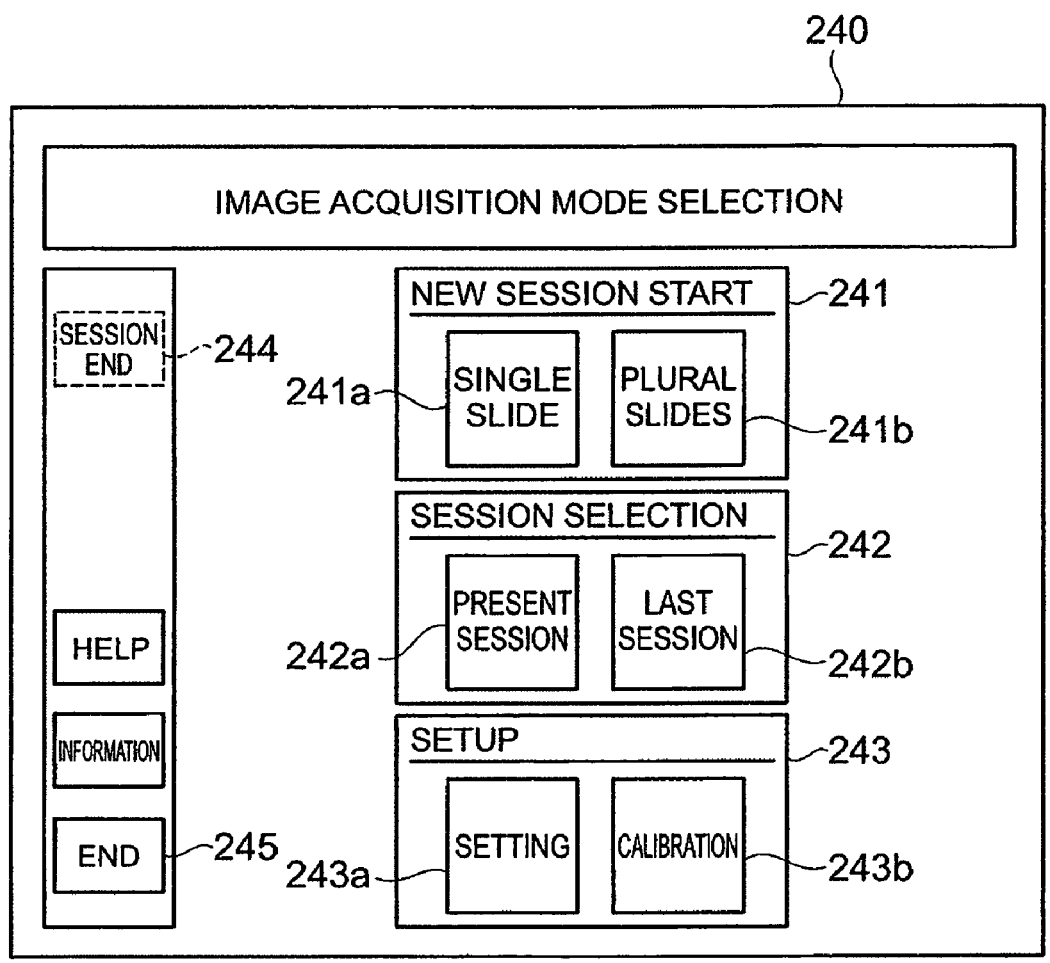
FIG. 15 is a figure showing an example of an operation screen used for session management and switching.

When the session ending process is completed, the screen displayed on the display device 61 returns to the mode selection screen 240 shown in FIG. 15. In this state, the door 12 of the sample storage unit 11 can be opened, and the sample group for image acquisition can be replaced with another. This mode selection screen 240 is basically the same as the screen 200 of FIG. 11, but is different from the screen 200 in the fact that the present session selection button 242a is operable. Since a session that has been executed up to now and about which session data is kept or a session precedent to this session can be selected by the session selection portion 242 in this way, the degree of freedom of an image acquiring operation by an operator is heightened.

For example, in a case in which image acquisition is performed by interruption concerning a specific slide when the screen 220 of FIG. 13 is displayed during the execution of image acquisition processing with respect to a certain sample group, an active session is paused by clicking the session end button 224, and the screen returns to the mode selection screen 240 of FIG. 15. The single slide mode selection button 241a or the plural slides mode selection button 241b is then clicked in the new session start portion 241, image acquisition is performed by the interruption concerning the slide, and thereafter, the screen again returns to the mode selection screen 240.

At this time, in the session selection portion 242, the session in which image acquisition has been performed by interruption is allocated to the "present session", whereas the session previously paused is allocated to the "last session". Therefore, image acquisition processing in the session being temporarily stopped can be restarted by resetting the sample group, which has been stopped before the completion of processing, in the sample storage unit 11 in this state and then clicking the last session selection button 242b. Even when the session being processed is abnormally terminated, image acquisition processing can be restarted at the middle of the process in the same way as above.

Additionally, for example, image data concerning a sample group that has already undergone image acquisition processing can be reconfirmed. In this case, a sample group to be confirmed is set in the sample storage unit 11, and a button for a corresponding session is clicked in the session selection portion 242 so as to display the processing execution screen 220 shown in FIG. 13, thus making it possible to confirm image data or the like that has been acquired.

If there is a slide with a problematic image data, an image acquisition processing for that slide can be again performed by clicking an image re-acquisition button 226 on the screen 220. In this case, concerning image acquisition processing to be reexecuted, only a micro image may be acquired, or, alternatively, the entire procedure for the acquisition of a macro image, the setting of image pickup conditions, and the acquisition of a micro image may be reexecuted.

A process corresponding to the image acquiring method performed in the image acquiring apparatus shown in FIG. 1 can be carried out by an image acquiring program for allowing the computer to execute the image acquisition processing. For example, the control unit 60 of the image acquiring apparatus can be made up of a CPU that runs each software program necessary for the image acquisition processing, a ROM in which the software programs are stored, and a RAM in which data is temporarily stored during program execution.

The image acquiring apparatus and the image acquiring method mentioned above can be realized by executing a predetermined image acquiring program by the CPU in the thus formed structure.

It is possible to record the program for making the CPU execute the processes for sample image acquisition on a computer-readable storage media and distribute these. These recording media include, for example, magnetic media such as hard disks and flexible disks, optical media such as CD-ROMs and DVD-ROMs, magnetic optical media such as floptical disks, and hardware devices such as RAMs, ROMs, and semiconductor nonvolatile memories exclusively installed so as to execute or store program commands.

Effects of the image acquiring apparatus, image acquiring method, and image acquiring program according to this embodiment will be described.

In the image acquiring apparatus, the image acquiring method, and the image acquiring program mentioned above, to control an image acquisition processing performed by setting a sample group consisting of a plurality of samples S in the sample storage unit 11, the concept of a session is employed in association with the sample group. In the session managing unit 73, an image acquisition processing is managed in association for each session between a sample group to be subjected to image acquisition and session data that is a data group including image data of acquired macro images, etc. According to this structure, in acquiring the images of a plurality of samples S, a processing to acquire the images can be suitably managed. Additionally, this session management enables an operator to work with a high degree of freedom.

Additionally, in the image acquiring apparatus of FIG. 1, the macro image acquiring unit 20 and the micro image acquiring unit 30 are provided with respect to a plurality of samples S, an image pickup condition for a micro image is set with reference to a macro image in the image pickup condition setting unit 71, and in the session managing unit 73, a data group including macro image data, an image pickup condition, and micro image data concerning each of the samples S is managed as session data. Accordingly, it becomes possible to efficiently acquire a high-resolution micro image of a sample S that can be used as sample image data used in, for example, a virtual microscope. Additionally, in this structure, macro image data, an image pickup condition, and micro image data each of which corresponds to a sample group are gathered together, and these pieces of data are managed as session data, thus making it possible to suitably manage the image acquisition processing, the condition setting processing, etc.

For example, if a micro image acquiring apparatus is provided independently of an image acquiring apparatus for macro image acquisition, it is preferable to use a data group including macro image data and image pickup conditions as session data. In this case, the data group managed as session data can be associated with micro image data, for example, by a method in which data is moved by a recording medium or the like.

In the image acquiring apparatus mentioned above, the control unit 60 includes the session switching unit 83 used to control session switching in a state in which the sample group and the session data are associated with each other for each session. This structure makes it possible to suitably perform and manage an image acquisition processing with respect to each of the sample groups, for example, in a case in which a plurality of sample groups each of which includes a plurality of samples S for image acquisition are prepared. Additionally, since such session switching can be made, the degree of freedom of the image acquiring operation is greatly heightened.

When a session is paused or ended by, for example, instructions from an operator, the session switching unit 83 instructs the session managing unit 73 to keep session data in the session. If session data in the session paused or ended in this way is kept by the data storage unit 75 or the like, an image acquisition processing can be performed through various steps, for example, the image acquisition processing in the paused session can be restarted at the middle of the process as mentioned above, or image data acquired in the already ended session can be confirmed, and, according to need, a part of the data can be reacquired.

Additionally, when a sample group is set in the sample storage unit 11, the session switching unit 83 instructs the session managing unit 73 to perform switching to an existing session in which session data is kept or to a new session according to, for example, instructions from an operator so as to be used as a session corresponding to the sample group. Therefore, even if the sample group to be set is either a sample group in which the session has been paused on the way or a new sample group, the efficiency of an image acquiring operation performed by the operator can be heightened by being appropriately associated with the session data.

Additionally, in the image acquiring apparatus mentioned above, the sample storage unit 11 is provided with the interlock mechanism 13, and hence, when the session is paused or ended, the session switching unit 83 instructs the sample storage unit 11 to undo the interlocking by the interlock mechanism 13.

According to this structure, while a session with respect to a sample group is being executed, the interlocking in the sample storage unit 11 can be brought into an ON state, and, when the session is paused or ended, the interlocking can be undone to reach an OFF state. Therefore, a session in which a sample group stored in the sample storage unit 11 is associated with the session data can be reliably managed by creating a correlation between the start/end of the session in the image acquisition processing and the ON/OFF of the interlocking in the sample storage unit 11.

In this embodiment, in the control unit 60, a semi-automatic mode that allows an operator to make a necessary confirmation when an image pickup condition for a micro image is set while referring to a macro image is provided as the control mode that controls the acquisition of macro images, the setting of image pickup conditions, and the acquisition of micro images with respect to each of the samples S. Therefore, for example, even when there is an unnecessary object in a slide used as a sample S, an influence exerted therefrom can be reliably removed, and an image pickup condition for the sample can be correctly set.

In the semi-automatic mode mentioned above, a sample S whose macro image has been acquired by the macro image acquiring unit 20 is placed at a standby position. According to this structure, the acquisition of a macro image of the sample S and the setting of an image pickup condition using the macro image can be performed independently of the acquisition of a micro image. Therefore, the operator has no need to pay constant attention to the image acquiring apparatus until the acquisition of the micro image is completed after having performed the acquisition of the macro image and the setting of the image pickup condition with respect to the samples S. As a result, a work burden imposed on the operator is greatly lightened.

Concerning the standby position of a sample S whose macro image has been already acquired, the storage position in the sample storage unit 11 is used as the standby position in the above embodiment, and the sample S whose macro image has been acquired is again returned to the storage position. Therefore, the structure of the microscope unit 10 can be simplified. Alternatively, a sample standby unit that can put a plurality of samples S on standby may be provided independently of the sample storage unit 11.

Additionally, the image acquiring apparatus mentioned above uses the sample transfer unit 14 and the sample stage 15 that is an XY stage as sample moving means for moving each of the samples S among the storage position in the sample storage unit 11, the standby position (which is identical with the storage position in the above structure), and the respective image acquiring positions for the macro image acquiring unit 20 and the micro image acquiring unit 30. According to this structure, the acquisition of a macro image, the setting of an image pickup condition, and the acquisition of a micro image, which are performed while moving the sample S thereamong, can be suitably realized.

The micro image acquiring unit 30 includes an image pickup device 31 having a one-dimensional sensor or a TDI-driven two-dimensional sensor, and a direction perpendicular to a longitudinal direction of an image pickup plane of the image pickup device 31 is used as a scanning direction followed when a micro image is acquired. Additionally, the micro image acquisition control unit 82 performs control to acquire a partial image while scanning a sample S in the scanning direction with the image pickup device 31, and to acquire a plurality of partial images that are used as micro images by repeatedly performing an operation for acquiring the partial images two or more times while changing the image pickup position along the longitudinal direction of the image pickup plane. According to this structure, strip-like high-resolution partial images by scanning the sample S in one direction are acquired, and are combined together in the other direction, thus making a micro image of the whole of the sample, therefore, image data of the sample S can be suitably acquired with fully high resolution.

In the image acquiring apparatus mentioned above, in the semi-automatic mode, the image pickup condition setting unit 71 displays an image pickup condition automatically obtained in accordance with a macro image on the display device 61 in the form of default values of the image pickup condition, and an operator selects whether to use this image pickup condition or to manually reset the image pickup condition. According to this structure, the operator can manually correct or reset the image pickup condition if there is a problem, for example, if the sample S has unnecessary objects, and if there is not such a problem, the operator can use the automatically-set image pickup condition without changes. Therefore, the operation for acquiring images of a plurality of samples S including the setting of the image pickup condition can be efficiently performed by manually setting the image pickup condition only when necessary.

Additionally, in the image acquiring apparatus, the image pickup condition setting unit 71 sets an image acquiring range R and a focus measuring position P, which are used as image pickup conditions for a micro image, with reference to a macro image, and the micro image acquisition control unit 82 acquires focus information about a sample S based on the focus measuring position P, and performs control to acquire a micro image based on the obtained focus information and the image acquiring range R. Therefore, parameters used to acquire the micro image can be suitably set from information concerning the sample S obtained from the macro image, and hence sample image data having high resolution and being in an excellent state can be acquired.

The full-automatic mode, in addition to the semi-automatic mode, is prepared as the image acquiring operation control mode of the control unit 60. According this structure, for image acquisition, the operator appropriately selects either the semi-automatic mode or the full-automatic mode as the control mode that controls the acquisition of a macro image with respect to each sample, the setting of an image pickup condition, and the acquisition of a micro image, and accordingly, depending on a state of samples S used for image acquisition, for example, depending on the fact that a sample S has much dust or a little dust, image acquisition can be carried out according to a suitable method. Concerning these control modes, switching between the control modes may be performed, for example, switching to the full-automatic mode may be performed during an operation in the semi-automatic mode. Preferably, either in the full-automatic mode or in the semi-automatic mode, if an acquired micro image has a problem after having completed image acquisition processing, image acquisition of the sample S can be again re-performed as a description of session switching has been given above.

The image acquiring apparatus, the image acquiring method, and the image acquiring program of the invention are not limited to those in the embodiment and structure examples, and they can be variously modified. For example, in the above embodiment, the present session and the last session, besides the new session, can be selected in the mode selection screen shown in FIG. 11 and FIG. 15. The number of sessions to be selected in this case can be increased more according to need. The interlock mechanism 13 in the sample storage unit 11 may be not provided if unnecessary. Concerning a plurality of samples, the sample storage means for storing a plurality of samples is provided in the above embodiment, however, such a plurality of samples may be managed by, for example, bar code information attached to each of the samples, without providing the sample storage means.

In the image acquiring apparatus according to the above embodiment, the macro image acquiring unit 20 and the micro image acquiring unit 30 are provided independently of each other, however, the light sources and the image acquiring means may be formed as a single light source and single image acquiring means, respectively, by providing an optical system for image acquisition switchable in accordance with the acquisition of a macro image or a micro image. In this case, an optical system provided with a revolver including an objective lens for macro image acquisition and an objective lens for micro image acquisition can be mentioned as an example of the switchable optical system for image acquisition.

In the above embodiment, the image pickup device capable of acquiring a one-dimensional image or the image pickup device capable of acquiring a two-dimensional image and capable of performing TDI driving is shown as the image pickup device 31 in the micro image acquiring unit 30, however, without being limited to this, an image pickup device, such as a two-dimensional CCD camera (area sensor), may be used. In this case, a micro image of the whole of a sample S can be produced by acquiring a plurality of high-resolution tile images and combining these images together, as is disclosed by U.S. Pat. No. 6,816,606.

Additionally, in the above embodiment, the image acquiring apparatus is formed by using the transmission type microscope system, however, the present invention is not limited to this. For example, in fluorescent observation, the transmission type light source may be replaced by an epi-illumination type light source so as to form a reflection type microscope system.

The image acquiring apparatus according to the above embodiment includes (1) macro image acquiring means for acquiring a macro image of each of a plurality of samples and (2) control means including macro image acquisition control means for controlling an operation to acquire the macro image by the macro image acquiring means, and image pickup condition setting means for setting an image pickup condition for a micro image of the sample with reference to the macro image, wherein (3) the control means includes session managing means for defining a session in accordance with a sample group consisting of the plurality of samples and managing a data group including data of the macro image and the image pickup condition for each of the samples as session data associated with the sample group for each session.

The image acquiring method includes (1) a macro image acquiring step of acquiring a macro image of each of a plurality of samples and (2) a control step including a macro image acquisition control step of controlling an operation to acquire the macro image by the macro image acquiring step, and an image pickup condition setting step of setting an image pickup condition for a micro image of the sample with reference to the macro image, wherein (3) the control step includes a session managing step of defining a session in accordance with a sample group consisting of the plurality of samples and managing a data group including data of the macro image and the image pickup condition for each of the samples as session data associated with the sample group for each session.

The image acquiring program is (1) applied to an image acquiring apparatus including macro image acquiring means for acquiring a macro image of each of a plurality of samples and includes (2) a control processing including a macro image acquisition control processing for controlling an operation to acquire the macro image by the macro image acquiring means, and an image pickup condition setting processing for setting an image pickup condition for a micro image of the sample with reference to the macro image, wherein (3) the control processing includes a session managing processing for defining a session in accordance with a sample group consisting of the plurality of samples and managing a data group including data of the macro image and the image pickup condition for each of the samples as session data associated with the sample group for each session, and the control processing is executed by a computer.

Preferably, the image acquiring apparatus includes micro image acquiring means for acquiring a micro image of the sample, the control means includes micro image acquisition control means for controlling a micro image acquiring operation by the micro image acquiring means, and the session managing means manages the data group including data of the macro image, the image pickup condition, and data of the micro image for each of the samples as the session data.

Likewise, preferably, the image acquiring method includes a micro image acquiring step of acquiring a micro image of the sample, the control step includes a micro image acquisition control step of controlling a micro image acquiring operation by the micro image acquiring step, and the session managing step manages the data group including data of the macro image, the image pickup condition, and data of the micro image for each of the samples as the session data.

Likewise, preferably, in the image acquiring program, the image acquiring apparatus includes micro image acquisition means for acquiring a micro image of the sample, the control processing includes a micro image acquisition control processing for controlling a macro image acquiring operation by the micro image acquiring means, and the session managing processing manages the data group including data of the macro image, the image pickup condition, and data of the micro image for each of the samples as the session data.

As mentioned above, the macro image acquiring means and the micro image acquiring means are provided for a plurality of samples, and an image pickup condition is set with reference to a macro image showing the whole of a sample, thereby acquiring a high-resolution micro image, therefore, it becomes possible to efficiently acquire a high-resolution micro image of a sample that can be used as sample image data for use in, for example, a virtual microscope. Additionally, in this structure, if macro image data, image pickup conditions, and micro image data concerning a sample group consisting of a plurality of samples are gathered together to be managed as session data, the image acquisition processing, the condition setting processing, etc., can be suitably managed.

Preferably, in the image acquiring apparatus, the control means includes session switching means for controlling session switching in a state in which a sample group and session data are associated with each other for each session. Likewise, preferably, in the image acquiring method, the control step includes a session switching step of controlling session switching in a state in which a sample group and session data are associated with each other for each session. Likewise, preferably, in the image acquiring program, the control processing includes a session switching processing for controlling session switching in a state in which a sample group and session data are associated with each other for each session.

In this structure, session data is managed for each session, and session switching is performed in correlation between a sample group and session data when switching between sessions is required in accordance with the replacement of the sample group by another. Therefore, for example, when a plurality of sample groups are prepared for image acquisition, an image acquisition processing with respect to each sample group can be suitably performed and managed. Additionally, since session switching can be performed in this way, the degree of freedom of an image acquisition operation is greatly improved.

Preferably, in the image acquiring apparatus, when a session is paused or ended, the session switching means instructs the session managing means to keep session data in this session.

Likewise, preferably, in the image acquiring method, when a session is paused or ended, the session switching step instructs the session managing step to keep session data in this session.

Likewise, preferably, in the image acquiring program, when a session is paused or ended, the session switching processing instructs the session managing processing to keep session data in this session.

Since session data in a paused or ended session is kept by, for example, a data storage means as mentioned above, an image acquisition operation can be performed according to various procedures, for example, an image acquisition processing in a paused session can be restarted at the middle of the process, or part of image data acquired in an already ended session can be re-acquired.

Preferably, in the image acquiring apparatus, when a sample group is set, the session switching means instructs the session managing means to perform switching to an existing session in which session data has been kept or to a new session so as to be used as a session corresponding to the sample group.

Likewise, preferably, in the image acquiring method, when a sample group is set, the session switching step instructs the session managing step to perform switching to an existing session in which session data has been kept or to a new session so as to be used as a session corresponding to the sample group.

Likewise, preferably, in the image acquiring program, when a sample group is set, the session switching processing instructs the session managing processing to perform switching to an existing session in which session data has been kept or to a new session so as to be used as a session corresponding to the sample group.

Accordingly, when the sample group to be set is either a sample group for which a session has been paused on the way or a new sample group, the efficiency of an image acquiring operation performed by an operator can be heightened by being appropriately associated with session data. Preferably, switching to the existing session or to the new session is performed according to instructions from the operator.

Preferably, in the image acquiring apparatus, the sample storage means for storing a plurality of samples is provided with an interlock mechanism that prevents the sample storage means from being opened during execution of the session, and the session switching means instructs the sample storage means to undo the interlocking by the interlock mechanism when the session is paused or ended.

Likewise, preferably, in the image acquiring method, the sample storage means for storing a plurality of samples is provided with an interlock mechanism that prevents the sample storage means from being opened during execution of the session, and the session switching step instructs the sample storage means to undo the interlocking by the interlock mechanism when the session is paused or ended.

Likewise, preferably, in the image acquiring program, the sample storage means of the image acquiring apparatus is provided with an interlock mechanism that prevents the sample storage means from being opened during execution of the session, and the session switching processing instructs the sample storage means to undo the interlocking by the interlock mechanism when the session is paused or ended.

According to this structure, while a session with respect to a sample group is being executed, the interlocking in the sample storage means can be brought into an ON state, and, when the session is paused or ended, the interlocking can be undone to reach an OFF state. Therefore, a session in which a sample group stored in the sample storage means is associated with session data can be reliably managed by creating a correlation between the start/end of the session in the image acquisition processing and the ON/OFF of the interlocking in the sample storage means.

The present invention can be used as an image acquiring apparatus, an image acquiring method, and an image acquiring program capable of suitably managing image acquisition processing performed to acquire an image of each of a plurality of samples.

What is claimed is:

1. An image acquiring apparatus comprising:
   macro image acquiring means for acquiring a macro image of each of a plurality of samples; and
   control means including macro image acquisition control means for controlling an operation to acquire the macro image by the macro image acquiring means, and image pickup condition setting means for setting an image pickup condition for a micro image of the sample with reference to the macro image, wherein
   the control means includes
      session managing means for defining a session in accordance with a sample group consisting of the plurality of samples and managing a data group including data of the macro image and the image pickup condition for each of the samples as session data associated with the sample group for each session; and
      session switching means for controlling switching between the sessions in a state in which the sample group and the session data are associated with each other for each session, and wherein
   sample storage means for storing the plurality of samples is provided with an interlock mechanism that prevents the sample storage means from being opened during execution of the session; and
   the session switching means instructs the sample storage means to undo interlocking by the interlock mechanism when the session is paused or ended.

2. The image acquiring apparatus according to claim 1, wherein when the session is paused or ended, the session switching means instructs the session managing means to keep the session data in this session.

3. The image acquiring apparatus according to claim 1, wherein, when the sample group is set, the session switching means instructs the session managing means to perform switching to an existing session in which the session data has been kept or to a new session so as to be used as the session corresponding to this sample group.

4. An image acquiring method comprising:
   a macro image acquiring step of acquiring a macro image of each of a plurality of samples; and
   a control step including a macro image acquisition control step of controlling an operation to acquire the macro image by the macro image acquiring step, and an image pickup condition setting step of setting an image pickup condition for a micro image of the sample with reference to the macro image, wherein
   the control step includes
   a session managing step of defining a session in accordance with a sample group consisting of the plurality of samples and managing a data group including data of the macro image and the image pickup condition for each of the samples as session data associated with the sample group for each session; and
   a session switching step of controlling switching between the sessions in a state in which the sample group and the session data are associated with each other for each session, and wherein
   sample storage means for storing the plurality of samples is provided with an interlock mechanism that prevents the sample storage means from being opened during execution of the session; and
   the session switching step instructs the sample storage means to undo interlocking by the interlock mechanism when the session is paused or ended.

5. The image acquiring method according to claim 4, wherein, when the session is paused or ended, the session switching step instructs the session managing step to keep the session data in this session.

6. The image acquiring method according to claim 4, wherein, when the sample group is set, the session switching step instructs the session managing step to perform switching to an existing session in which the session data has been kept or to a new session so as to be used as the session corresponding to this sample group.

7. A non-transitory computer-readable storage medium having embodied thereon an image acquiring program that is applied to an image acquiring apparatus including macro image acquiring means for acquiring a macro image of each of a plurality of samples; the image acquiring program comprising:

a control processing including a macro image acquisition control processing for controlling an operation to acquire the macro image by the macro image acquiring means, and an image pickup condition setting processing for setting an image pickup condition for a micro image of the sample with reference to the macro image, wherein the control processing includes a session managing processing for defining a session in accordance with a sample group consisting of the plurality of samples and managing a data group including data of the macro image and the image pickup condition for each of the samples as session data associated with the sample group for each session; and a session switching processing for controlling switching between the sessions in a state in which the sample group and the session data are associated with each other for each session; the control processing being executed by a computer, and wherein the image acquiring apparatus includes sample storage means for storing the plurality of samples, the sample storage means being provided with an interlock mechanism that prevents the sample storage means from being opened during execution of the session; and the session switching processing instructs the sample storage means to undo interlocking by the interlock mechanism when the session is paused or ended.

8. The non-transitory computer-readable storage medium according to claim 7, wherein, when the session is paused or ended, the session switching processing instructs the session managing processing to keep the session data in this session.

9. The non-transitory computer-readable storage medium according to claim 7, wherein, when the sample group is set, the session switching processing instructs the session managing processing to perform switching to an existing session in which the session data has been kept or to a new session so as to be used as the session corresponding to this sample group.

10. The image acquiring apparatus according to claim 1, further comprising micro image acquiring means for acquiring a micro image of the sample, wherein the control means includes micro image acquisition control means for controlling an operation to acquire the micro image by the micro image acquiring means, and the session managing means manages the data group including data of the macro image, the image pickup condition, and data of the micro image for each of the samples as the session data.

11. The image acquiring method according to claim 4, further comprising a micro image acquiring step of acquiring a micro image of the sample, wherein the control step includes a micro image acquisition control step of controlling an operation to acquire the micro image by the micro image acquiring step, and the session managing step manages the data group including data of the macro image, the image pickup condition, and data of the micro image for each of the samples as the session data.

12. The non-transitory computer-readable storage medium according to claim 7, wherein the image acquiring apparatus includes micro image acquiring means for acquiring a micro image of the sample, the control processing includes a micro image acquisition control processing for controlling an operation to acquire the micro image by the micro image acquiring means, and the session managing processing manages the data group including data of the macro image, the image pickup condition, and data of the micro image for each of the samples as the session data.

* * * * *